(12) United States Patent
Levene et al.

(10) Patent No.: US 8,513,612 B2
(45) Date of Patent: Aug. 20, 2013

(54) IMAGING MEASUREMENT SYSTEM WITH A PRINTED ORGANIC PHOTODIODE ARRAY

(75) Inventors: Simha Levene, D.N. Hanegev (IL); Ami Altman, Tel-Aviv (IL); Naor Wainer, Zichron Yaakov (IL); Dagobert M. de Leeuw, Eersel (NL); Eliav Haskal, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 23 days.

(21) Appl. No.: 13/263,853

(22) PCT Filed: Mar. 15, 2010

(86) PCT No.: PCT/IB2010/051105
§ 371 (c)(1),
(2), (4) Date: Oct. 11, 2011

(87) PCT Pub. No.: WO2010/122433
PCT Pub. Date: Oct. 28, 2010

(65) Prior Publication Data
US 2012/0037809 A1  Feb. 16, 2012

Related U.S. Application Data

(60) Provisional application No. 61/171,507, filed on Apr. 22, 2009.

(51) Int. Cl.
*G01T 1/24* (2006.01)
(52) U.S. Cl.
USPC .................................... 250/370.08

(58) Field of Classification Search
USPC ................... 250/370.01–370.15; 378/98.8
See application file for complete search history.

(56) References Cited

U.S. PATENT DOCUMENTS

| | | | |
|---|---|---|---|
| 4,937,453 A * | 6/1990 | Nelson .................... | 250/370.09 |
| 5,933,168 A | 8/1999 | Sakai | |
| 6,426,991 B1 * | 7/2002 | Mattson et al. .................. | 378/19 |
| 7,085,344 B2 * | 8/2006 | Prasser et al. .................. | 378/19 |
| 7,148,486 B2 | 12/2006 | Heismann et al. | |
| 7,180,075 B2 | 2/2007 | Brabec et al. | |
| 7,606,346 B2 * | 10/2009 | Tkaczyk et al. ................ | 378/19 |
| 7,613,274 B2 * | 11/2009 | Tkaczyk et al. ................ | 378/5 |

(Continued)

FOREIGN PATENT DOCUMENTS

| WO | 2004086527 A1 | 10/2004 |
|---|---|---|
| WO | 2006125730 A1 | 11/2006 |

(Continued)

OTHER PUBLICATIONS

Aldrich; Material Matters, 2007, pp. 1-32, vol. 2, No. 3, Aldrich Chemical Co., Inc., Sigma-Aldrich Corporation, Milwaukee, WI.

(Continued)

*Primary Examiner* — Kiho Kim

(57) ABSTRACT

An imaging system includes a macro organic photodiode array with rows and columns of printed photodiodes. The array may be bendable for easy manufacture and assembly on a curved support within an imaging system. Two or more layers of photodiodes may be provided for use in a spectral CT imaging system or as slices.

29 Claims, 15 Drawing Sheets

(56) References Cited

U.S. PATENT DOCUMENTS

| | | | |
|---|---|---|---|
| 2003/0121976 A1* | 7/2003 | Ostergard | 235/454 |
| 2003/0178570 A1* | 9/2003 | Tsunota et al. | 250/370.11 |
| 2004/0016886 A1 | 1/2004 | Ringermacher et al. | |
| 2004/0125917 A1* | 7/2004 | Ross et al. | 378/98.8 |
| 2004/0159793 A1* | 8/2004 | Brabec et al. | 250/370.11 |
| 2004/0187911 A1 | 9/2004 | Gaudiana et al. | |
| 2007/0075252 A1 | 4/2007 | Misawa | |
| 2007/0181179 A1 | 8/2007 | Brabec et al. | |
| 2007/0193621 A1 | 8/2007 | Brabec et al. | |
| 2007/0246094 A1 | 10/2007 | Brabec et al. | |
| 2007/0267055 A1 | 11/2007 | Gaudiana et al. | |
| 2007/0289626 A1 | 12/2007 | Brabec et al. | |
| 2007/0292307 A1 | 12/2007 | Padinger et al. | |
| 2008/0006324 A1 | 1/2008 | Berke et al. | |
| 2008/0026448 A1 | 1/2008 | Lydersen et al. | |
| 2008/0105943 A1 | 5/2008 | Furst et al. | |
| 2008/0264488 A1 | 10/2008 | Balasubramanian et al. | |
| 2009/0057659 A1 | 3/2009 | Maehara et al. | |

FOREIGN PATENT DOCUMENTS

| | | |
|---|---|---|
| WO | 2006134090 A1 | 12/2006 |
| WO | 2006134114 A1 | 12/2006 |
| WO | 2008061771 A1 | 5/2008 |
| WO | 2009083852 A2 | 7/2009 |

OTHER PUBLICATIONS

Anthopoulos, Thomas D. et al., Solution processible organic transistors and circuits based on a C70 methanofullerene, Journal of Applied Physics 98, 2005, pp. 054503-1 to 054503-6, American Institute of Physics.

Edman, L.; A New Way Could Lead to Cheap and Flexible Electronics; 2009; Electronics World.

Keivanidis, Panagiotis E. et al., X-ray stability and response of polymeric photodiodes for imaging applications, The Smithsonian/NASA Astrophysics Data System, 2008, Applied Physics Letters, vol. 92, Issue 2, 1 page.

Medical Device Link; Developer of Organic Photonic Sensors Shortlisted for National Innovation Award; http://www.devicelink.com/emdm/archive/06/03/012.html; printed Mar. 13, 2009.

Meijer, E.J. et al., Solution-processed ambipolar organic field-effect transistors and inverters, Nature Materials, Oct. 2003, pp. 678-682 & 834, vol. 2, Nature Publishing Group.

Ramuz, Marc et al., High sensitivity organic photodiodes with low dark currents and increased lifetimes, Organic Electronics, 2008, pp. 369-376, ScienceDirect.

Rauch, Tobias et al., Performance of bulk-heterojunction organic photodetectors, 4th IEEE Conference on Nanotechnology, 2004, pp. 632-634, IEEE.

Sigma-Aldrich; PCBM-Based n-Type Semiconductors, Sigma-Aldrich, http://www.sigmaaldrich.com/materials-science/organic-electronics/pcbm.html, pp. 1-4, accessed and printed Apr. 9, 2009.

Someya, Takao et al., Integration of Organic FETs With Organic Photodiodes for a Large Area, Flexible, and Lightweight Sheet Image Scanners, IEEE Transactions on Electron Devices, Nov. 2005, pp. 2502-2511, vol. 52, No. 11, IEEE.

Tedde, S. et al., Active Pixel Concept Combined With Organic Photodiode for Imaging Devices, IEEE Electron Device Letters, Oct. 2007, pp. 893-895, vol. 28, No. 10, IEEE.

Weisfield, Richard L. et al., Performance analysis of a 127-micron pixel large-area TFT/photodiode array with boosted fill factor, 11 pages (2004).

* cited by examiner

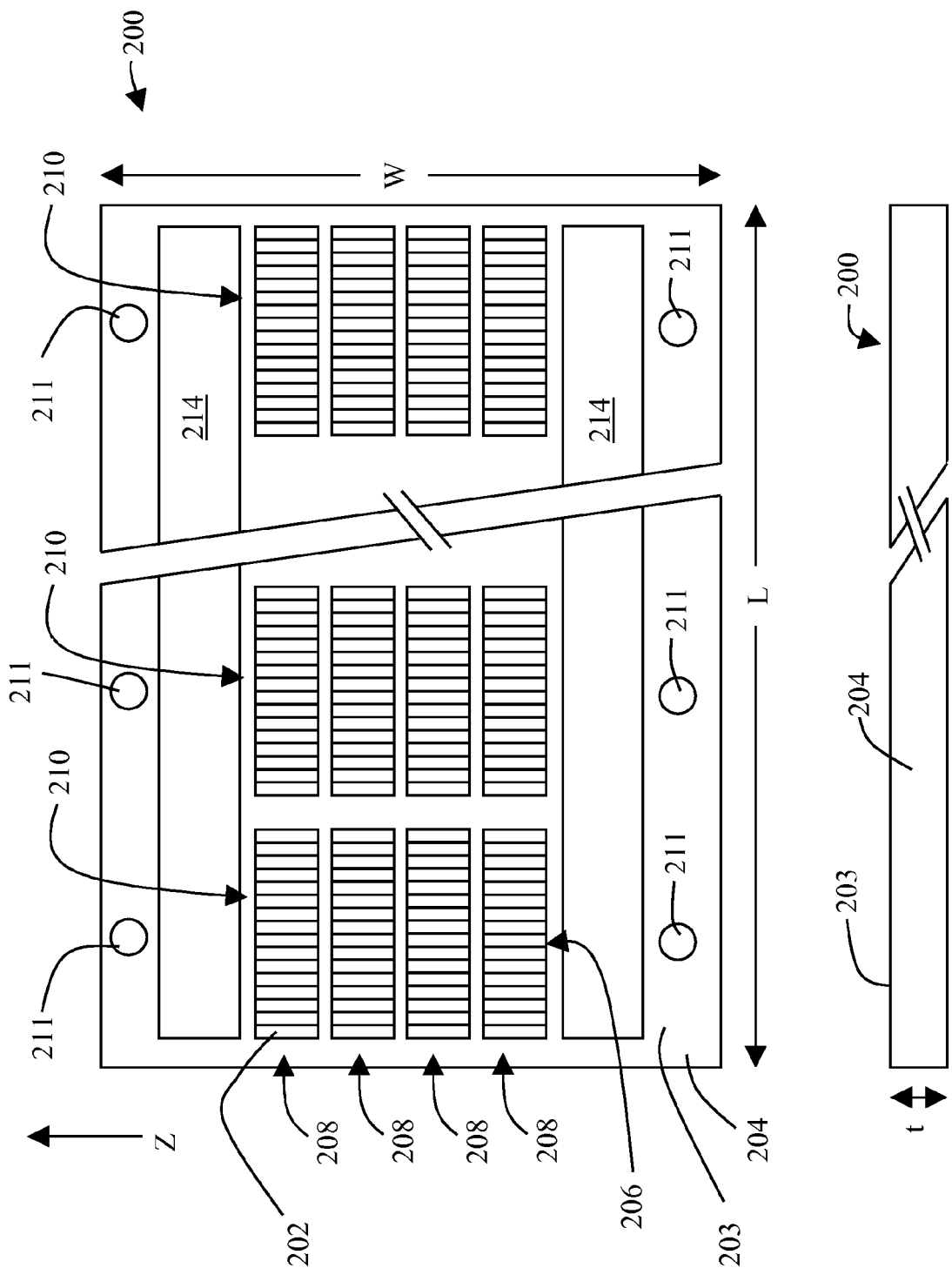

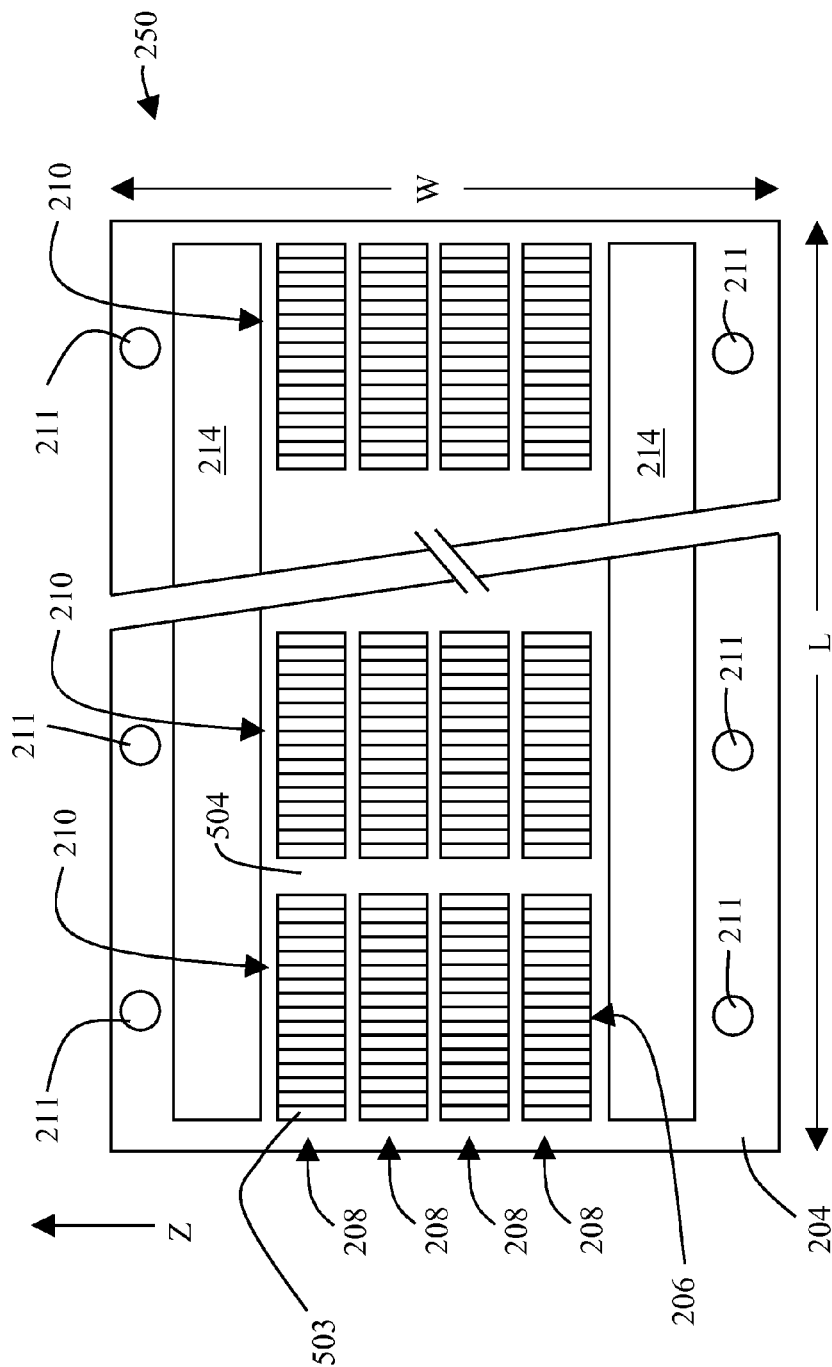
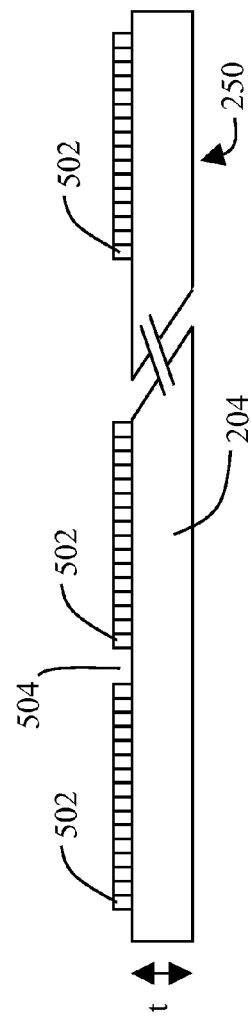
FIG. 5
FIG. 6

IMAGING MEASUREMENT SYSTEM WITH A PRINTED ORGANIC PHOTODIODE ARRAY

CROSS REFERENCE TO RELATED APPLICATIONS

This application claims the benefit of U.S. provisional application Ser. No. 61/171,507 filed Apr. 22, 2009, which is incorporated herein by reference.

The present application relates generally to the imaging arts, and in particular a data measurement system useful for CT and other imaging modalities. These imaging modalities are useful in many contexts, such as medical imaging, security imaging for example baggage scanning, and other contexts.

One challenge posed by previously known CT imaging systems is connecting, both mechanically and electrically, the x-ray detectors to the rest of the system. Indeed, a substantial part of the cost of known CT data measurement systems arises from the connectors which enable each detector array to be plugged in to the data measurement system and be mechanically mounted upon it with high spatial and electrical precision. Good image quality in CT imaging usually requires that the dixels (detector pixels) in each array be mounted precisely with reference to each other, to the x-ray tube focal spot, and to the cradle.

The present invention achieves the requisite precision with successive sub-assemblies whereby scintillators are positioned with respect to a printed photodiode array to form a detector array, with very fine precision to avoid excessive build-up of tolerances. This design substantially reduces the cost and complexity of the overall data measurement system. The proposed system also lends itself to duplication in layers to form a multi-layer spectral CT data measurement system such as a two layer spectral CT system. Thus, use of a printed organic photodiode array to form a data measurement system in a CT or other imaging apparatus is very beneficial. The present invention concerns various structures and geometries for using printed organic photodiodes in a CT scanner or other imaging scanner data measurement system.

According to one aspect of the present invention, an imaging system is provided including a radiation source which rotates around a central z-axis of the imaging system to perform imaging scans, and a printed organic photodiode array including several discrete photodiodes printed in rows and columns on a support that is curved, such that each row of photodiodes is aligned along the curve of the curved support, and each column of photodiodes is aligned in parallel to the central z-axis of the imaging system. The organic photodiodes may comprise a PCBM-based polymeric material. Each photodiode is associated with a scintillator, which may be a composite scintillator, to form one of the dixels of a detector array. The detector array may include two or more layers, each comprising a printed organic photodiode array and an associated layer of scintillator arrays, for use as a spectral CT imaging system.

According to another aspect of the present invention, a bendable printed organic photodiode array assembly for use in an imaging system is provided, including a bendable support. The bendable support may be, for example, a PET film, a polyimide film, a PEET film, or a nylon film. The array assembly is mountable within a cradle, such that each photodiode is associated with a scintillator to form a dixel, as an image data measurement system in an imaging apparatus. The detector array may include two or more layers for use as a spectral CT imaging system. Related methods of making such arrays are also provided.

Numerous advantages and benefits will become apparent to those of ordinary skill in the art upon reading the following detailed description of preferred embodiments. The invention may take form in various components and arrangements of components, and in various process operations and arrangements of process operations. The drawings are only for the purpose of illustrating preferred embodiments and are not to be construed as limiting the invention.

FIGS. 2 and 3 are respectively a front view and a side view of an organic photodiode array 200;

Figure 7:
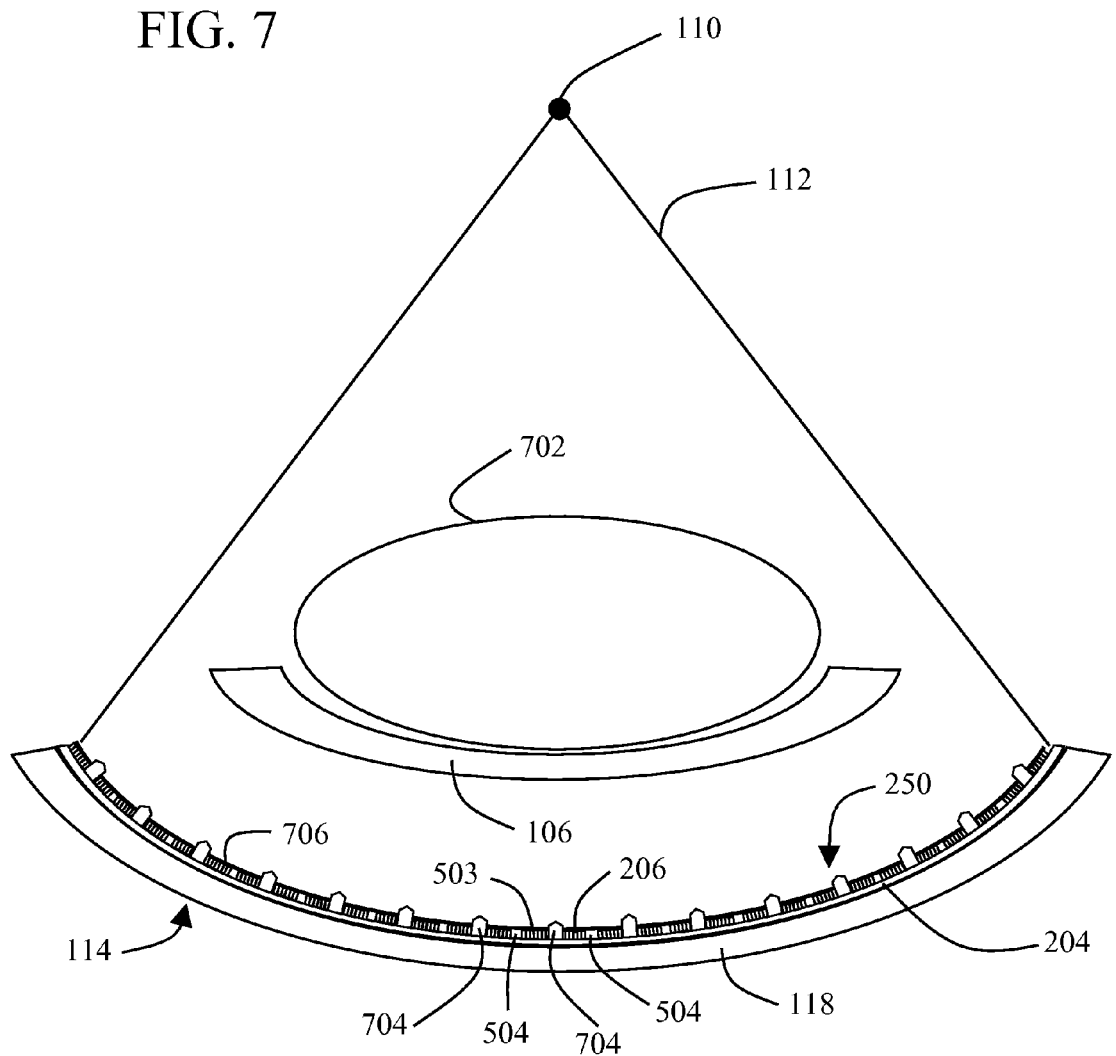
Figure 8:
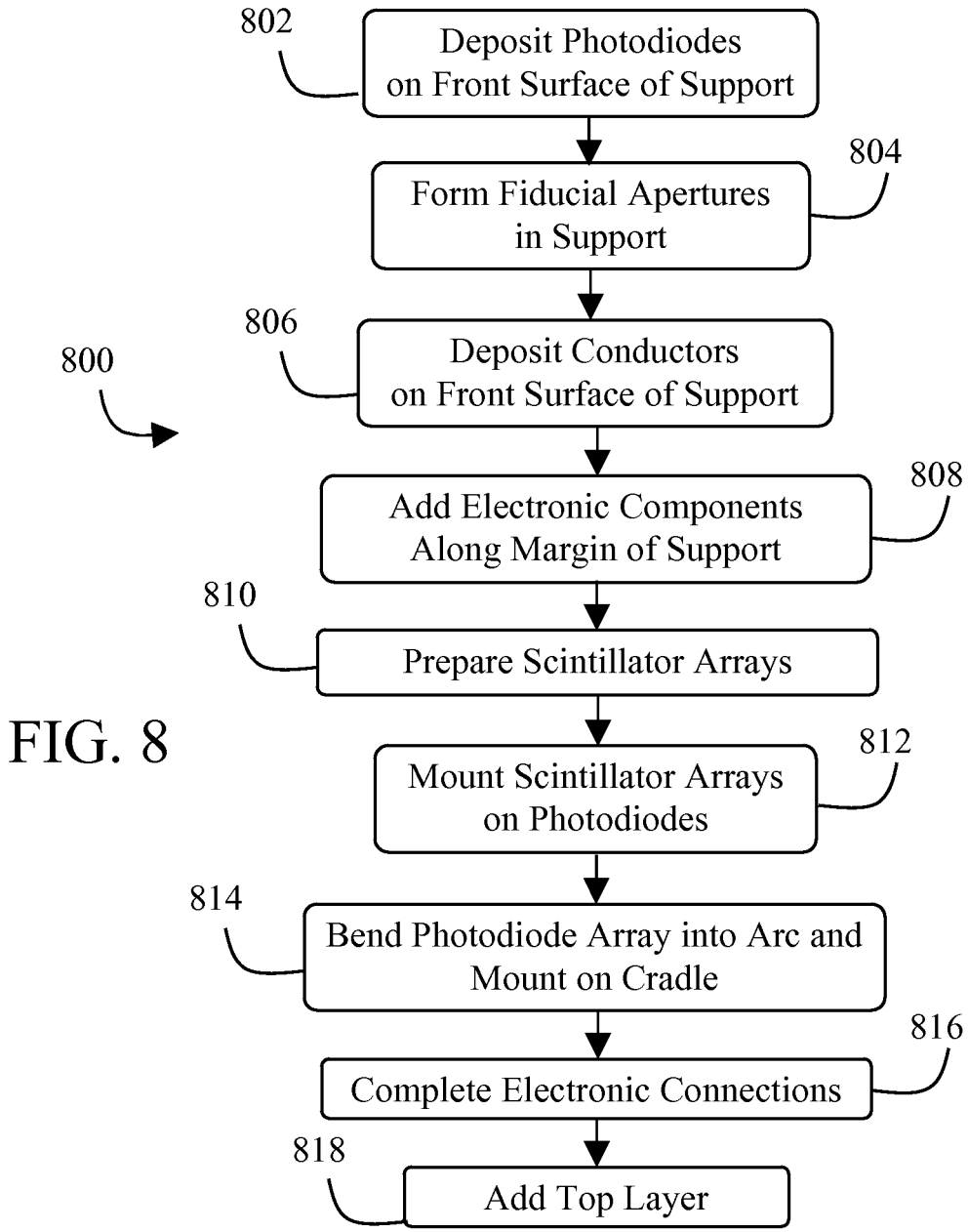
Figure 9:
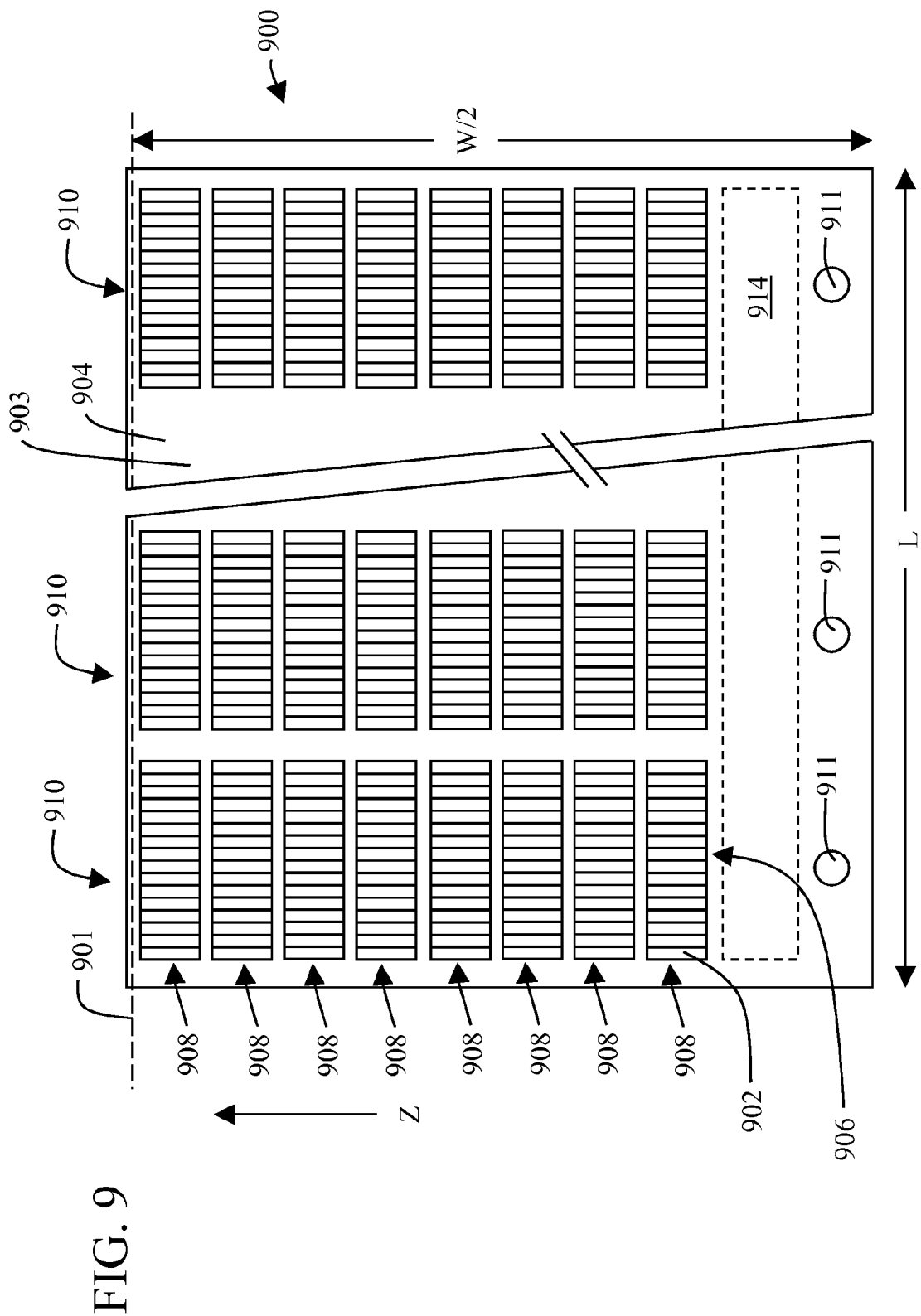
Figure 10:
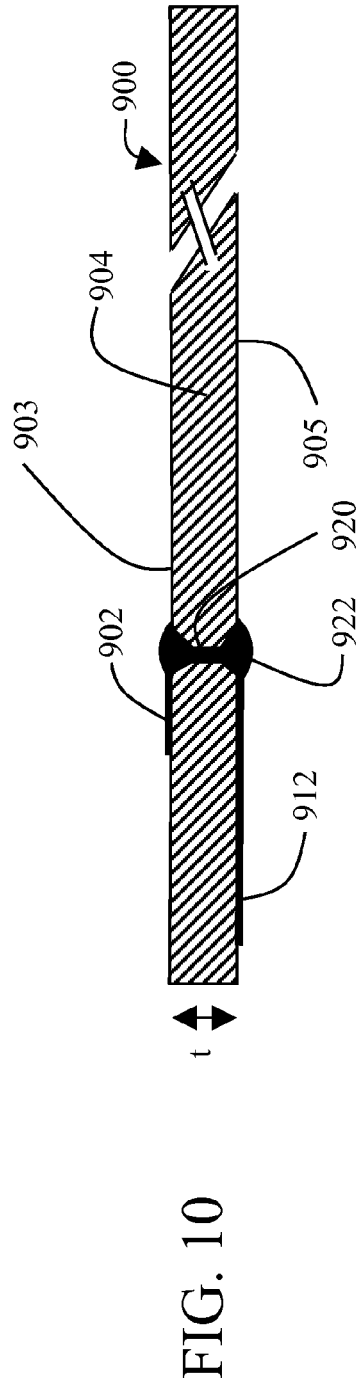
Figure 11:
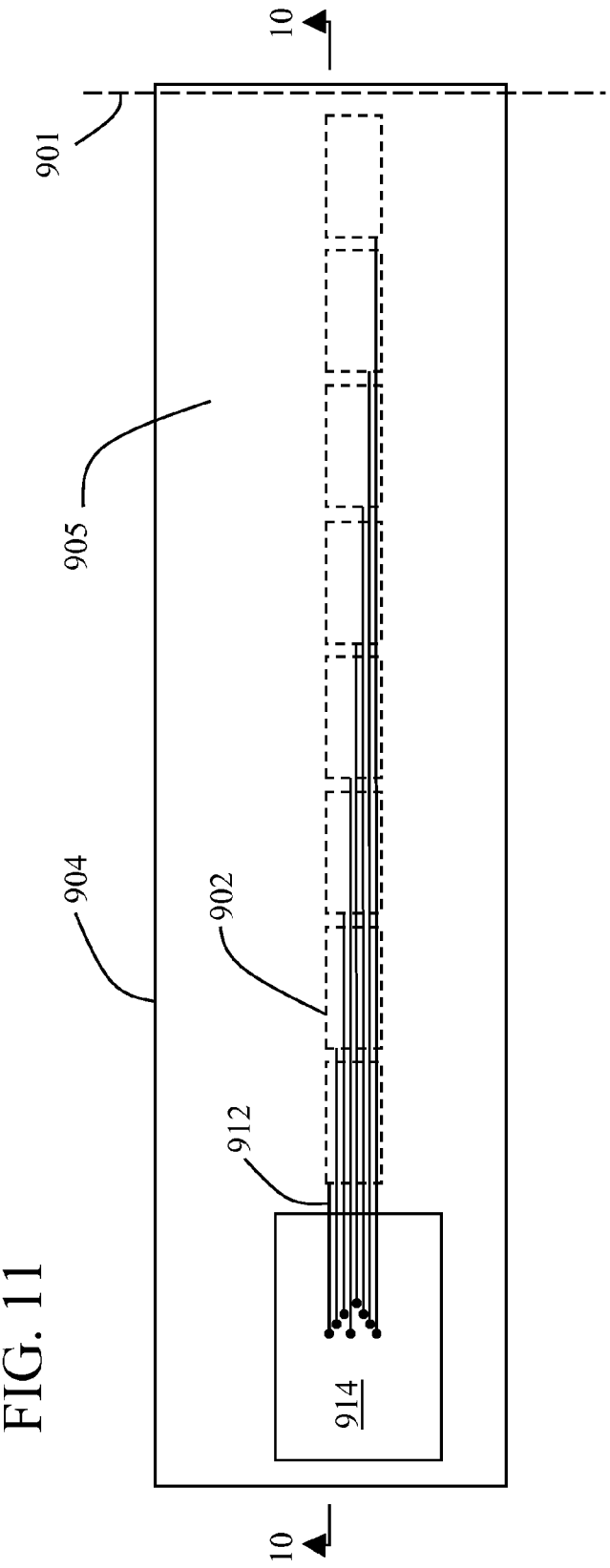
Figure 12:
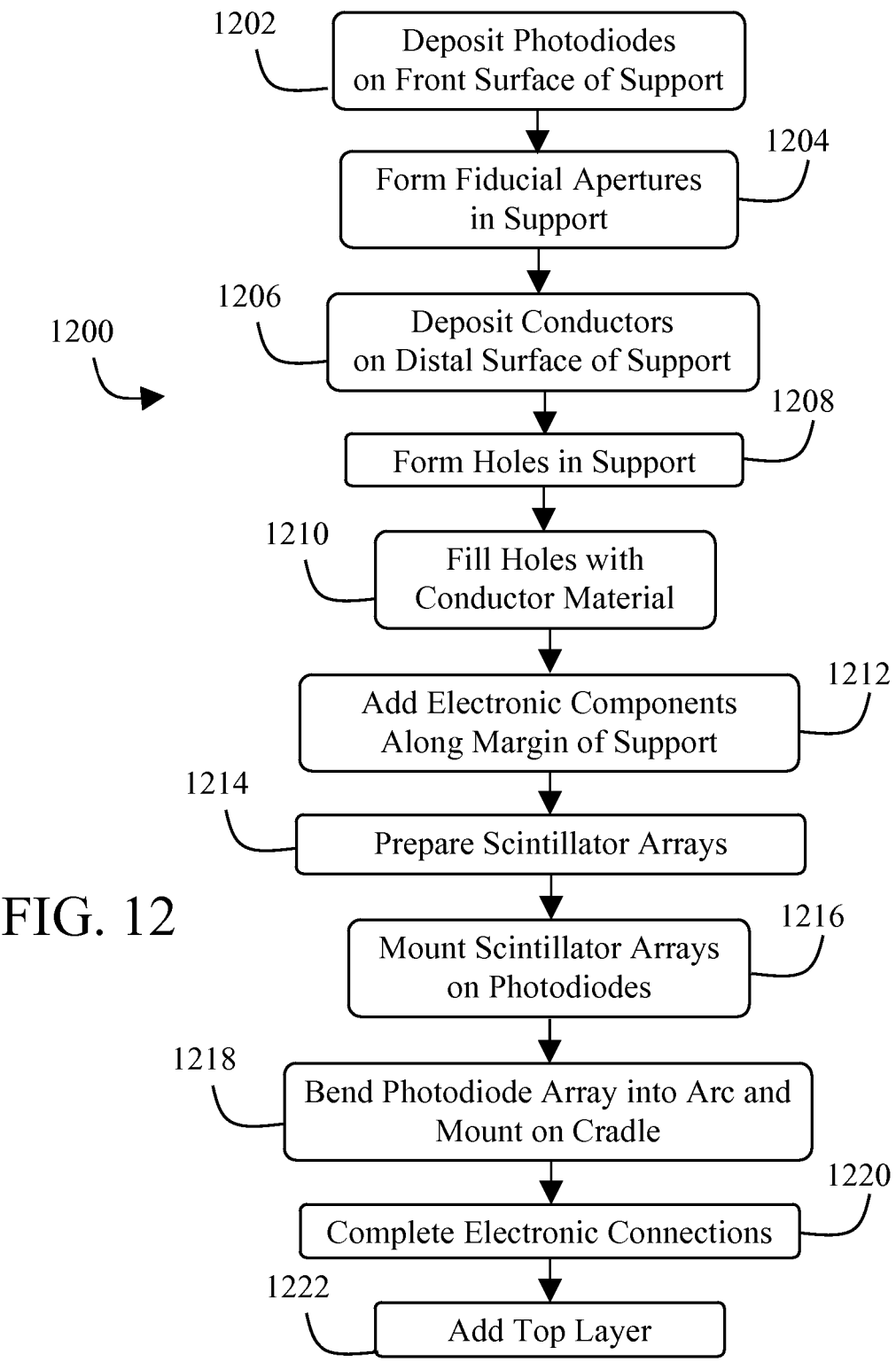
Figure 13:
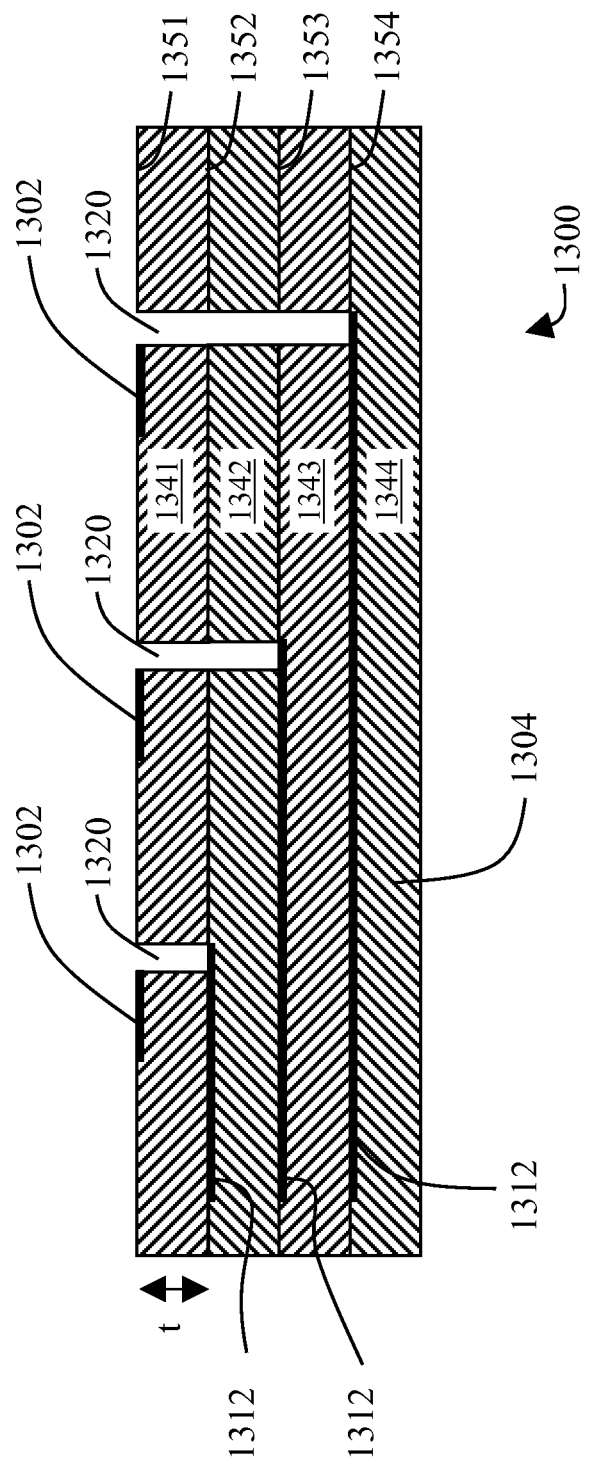
Figure 14:
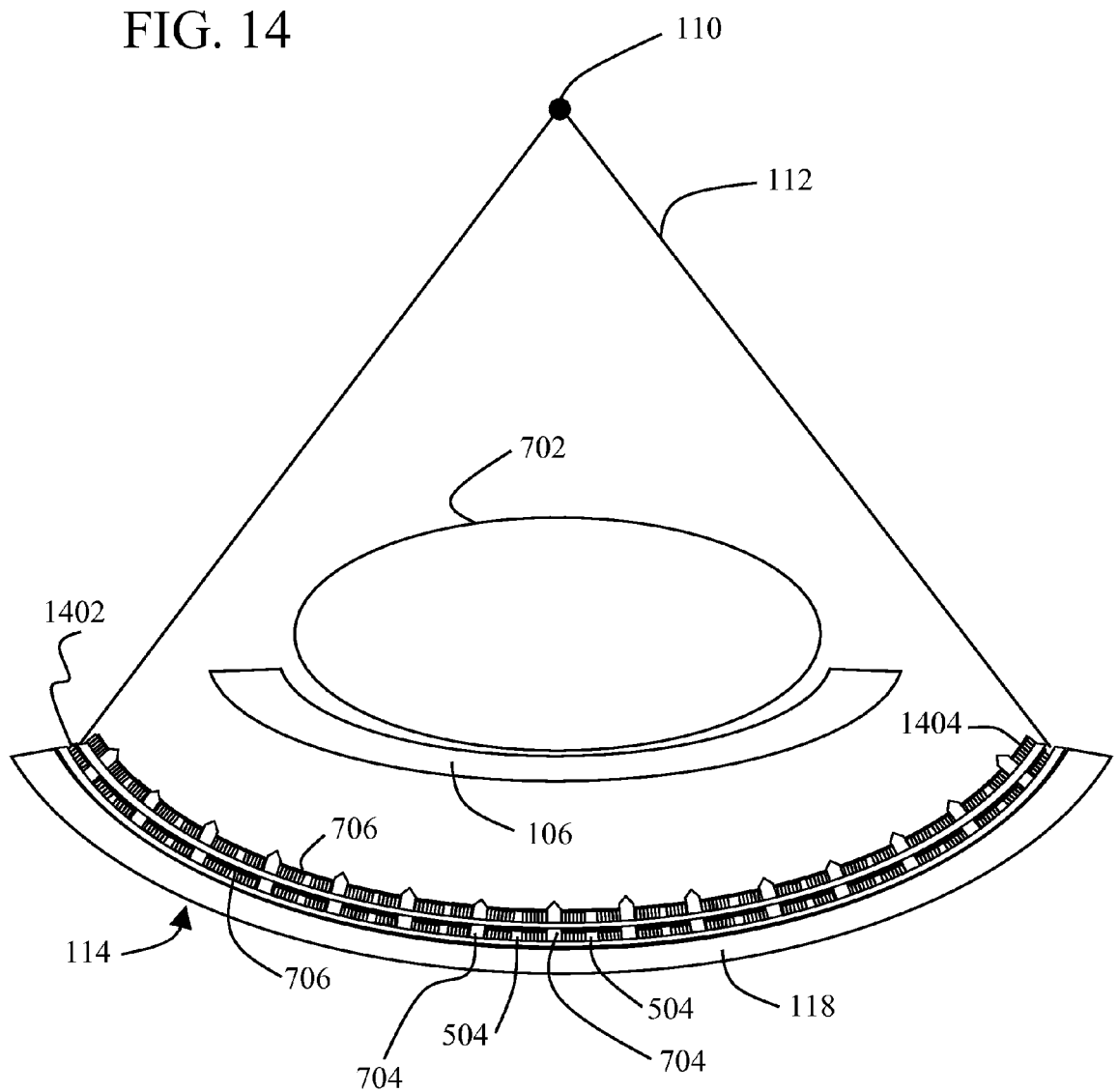
Figure 15:
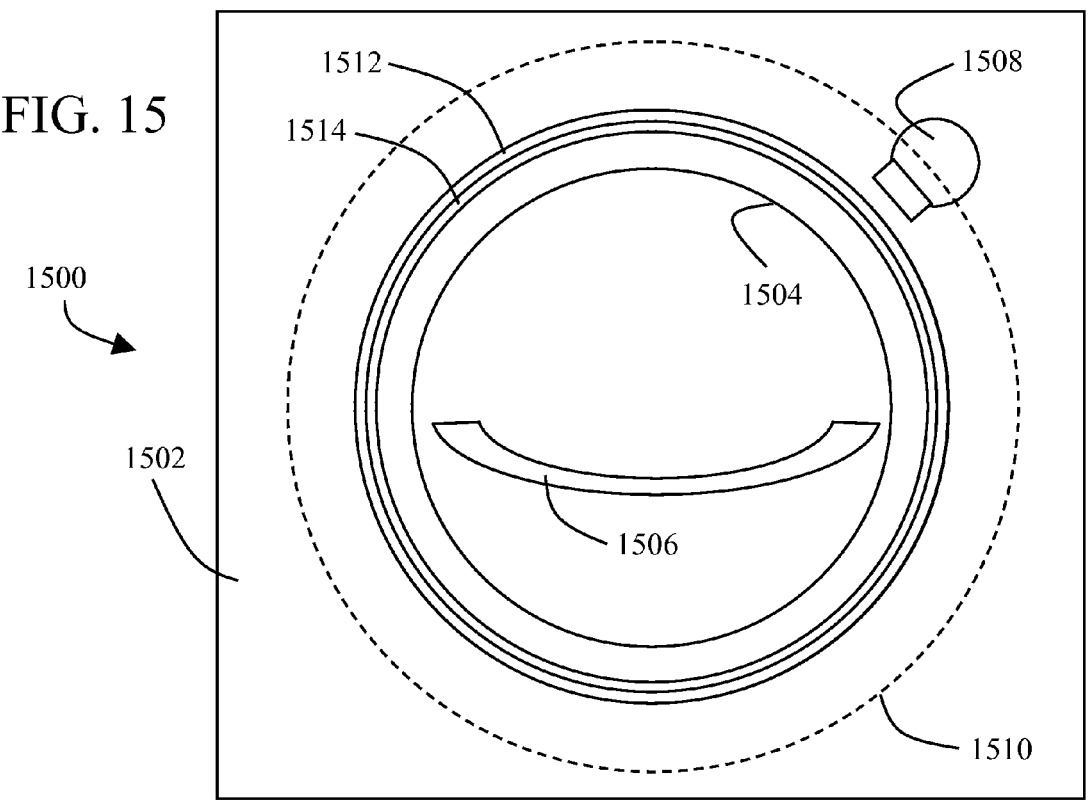
Figure 16:
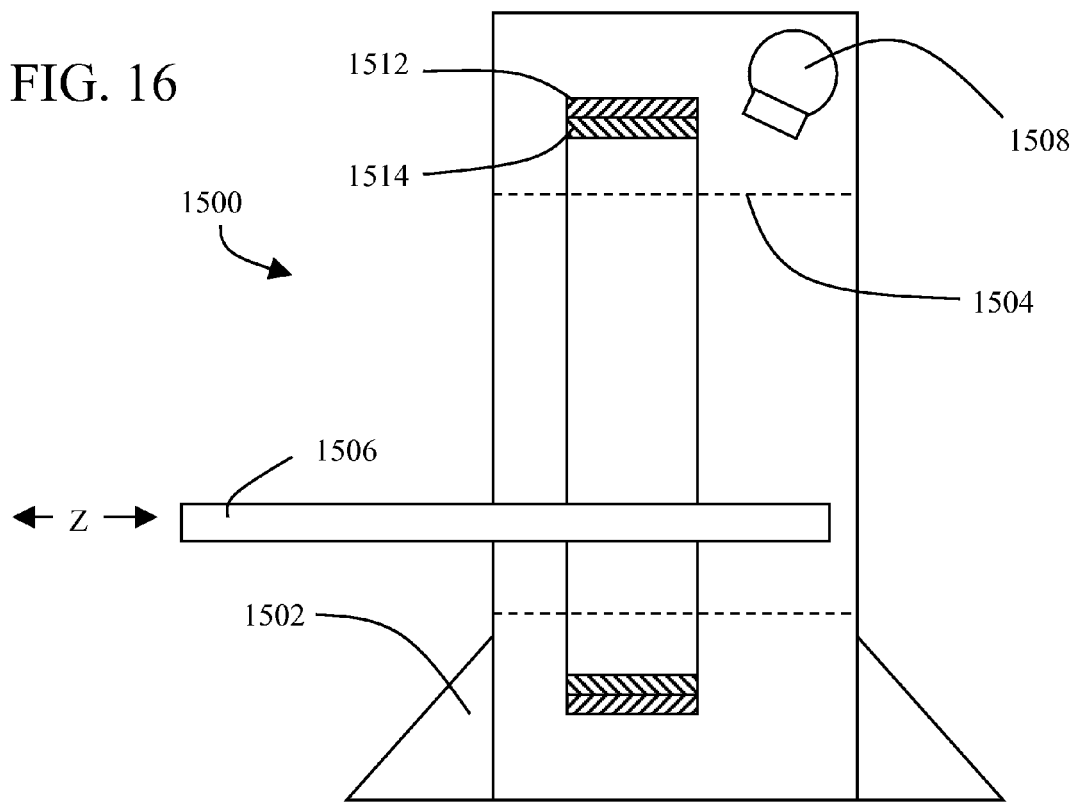
Figure 17:
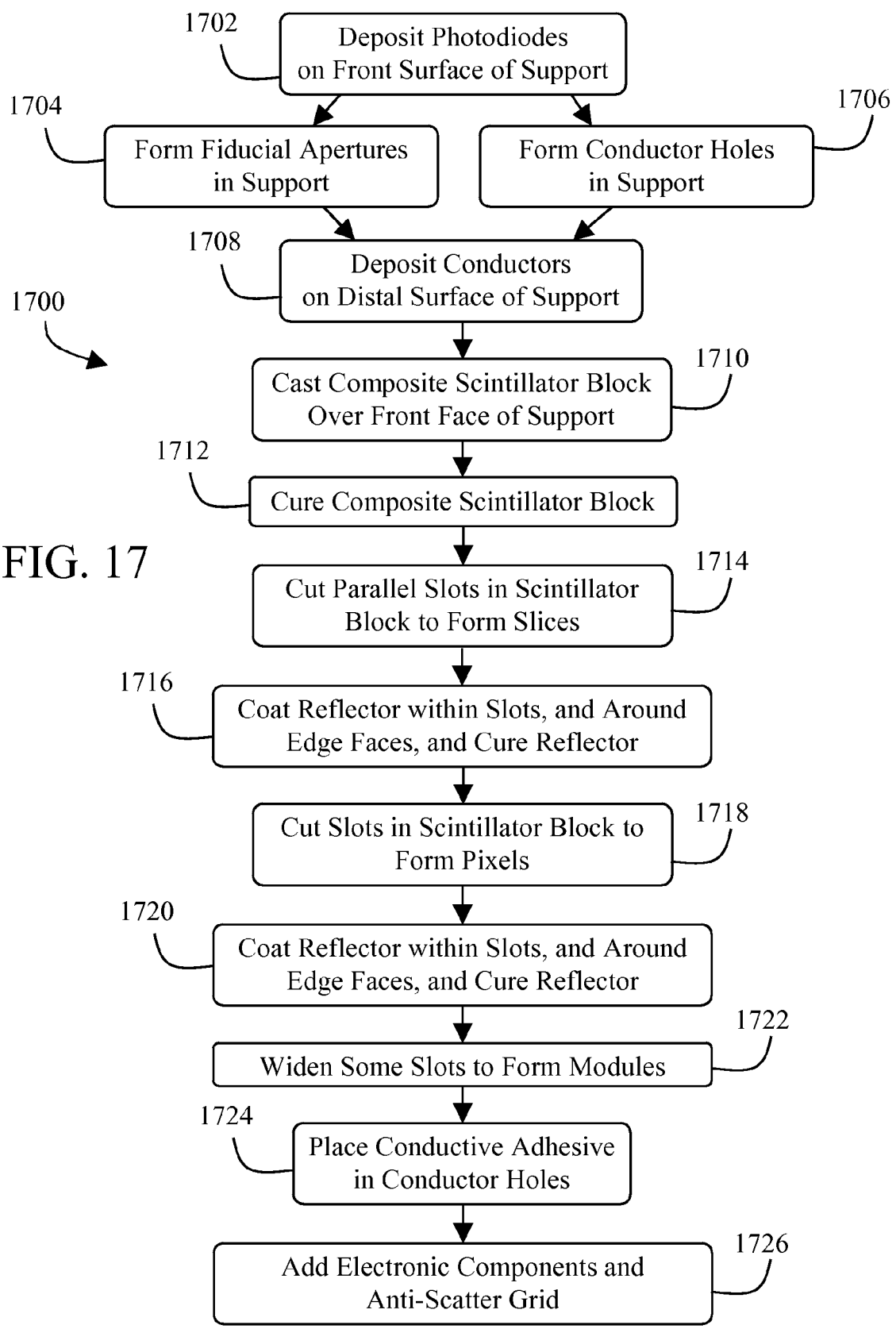
Figure 18:
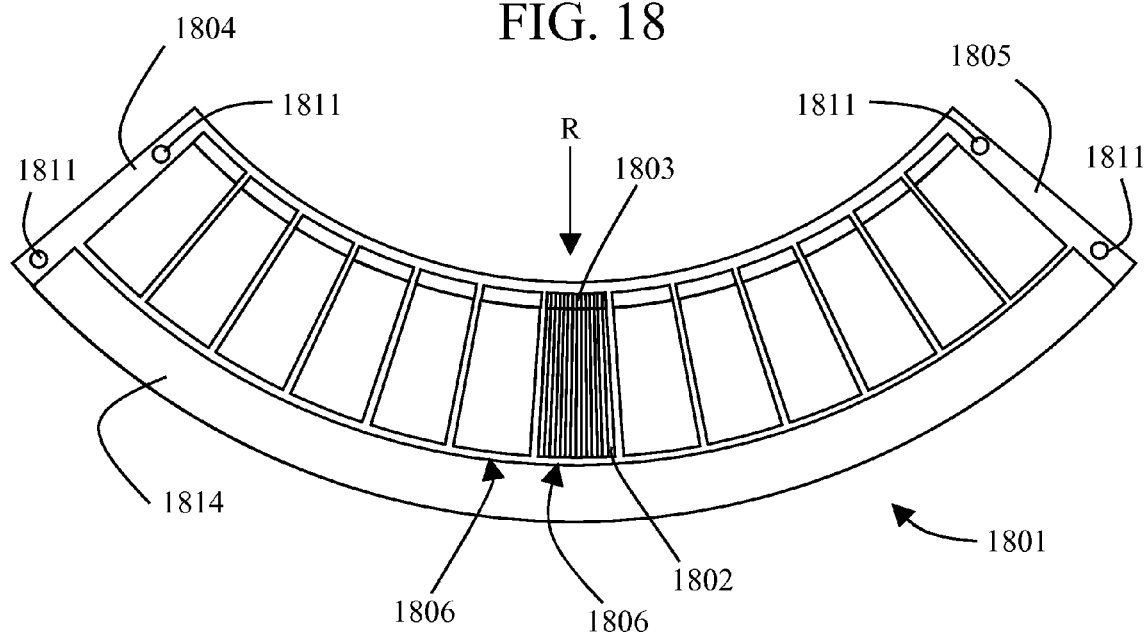
Figure 19:
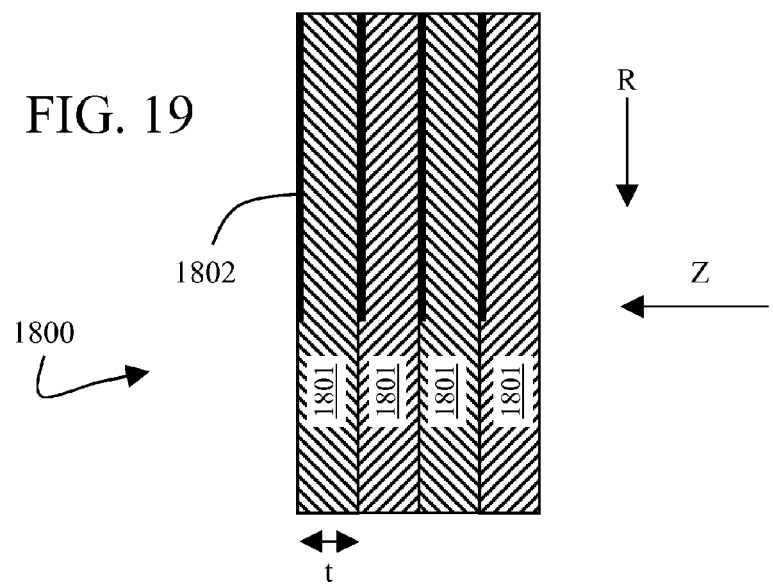
Figure 20:
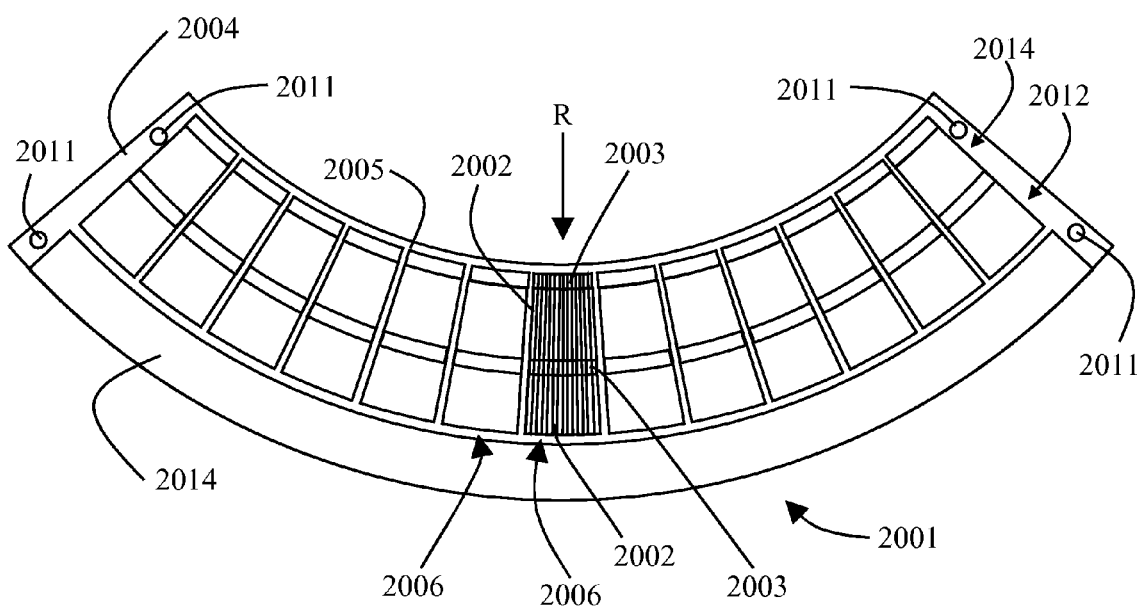

FIGS. 5 and 6 are respectively a front view and a side view of the array 200, with scintillators 502 being added to form a macro detector array 250;

FIG. 7 is a schematic trans-axial view of the macro organic photodiode array 200, with scintillators 502 added to form a macro detector array 250, disposed within the CT imaging apparatus 100;

FIG. 8 illustrates a process 800 of manufacturing and assembling the macro organic photodiode array 200, and adding scintillators 502 to form a macro detector array 250;

FIG. 9 is a partial front view of a macro organic photodiode array 900;

FIG. 10 is a cross-sectional side view of the macro organic photodiode array 900, taken along line 10-10 in FIG. 11;

FIG. 11 is a close-up view of the distal surface of the macro organic photodiode array 900;

FIG. 12 illustrates a process 1200 of manufacturing and assembling a macro detector array 950 incorporating the photodiode array 900 and scintillators;

FIG. 13 is a cross-sectional view of a macro organic photodiode array 1300 having more than one layer;

FIG. 14 is a schematic transaxial view of a spectral CT imaging system;

FIGS. 15 and 16 are respectively a schematic front view and a schematic sectional side view of a fourth generation CT imaging apparatus 1500;

FIG. 17 illustrates a process 1700 of manufacturing and assembling a macro detector array, using a composite scintillator;

FIG. 18 is a schematic trans-axial view of a sectorial-shaped imaging element 1801 using a macro organic photodiode array;

FIG. 19 is a schematic cross-sectional side view of a macro detector array 1850 incorporating several sectorial-shaped elements 1801; and FIG. 20 is a schematic trans-axial view of a sectorial-shaped imaging element 1901 using a macro organic photodiode array appropriate for a spectral CT apparatus.

CT IMAGING APPARATUS

Figure 1:
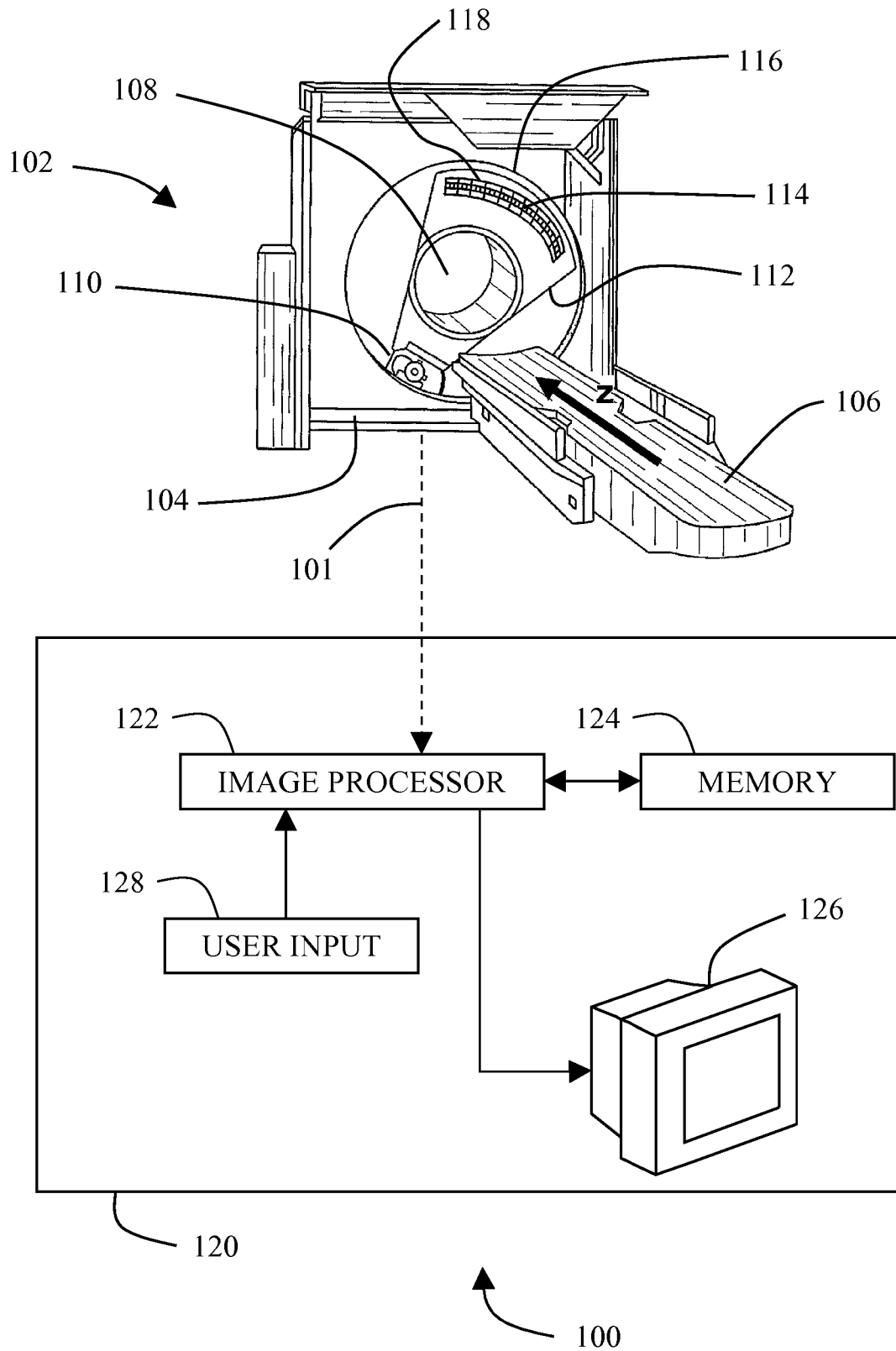
FIG. 1 illustrates a CT imaging apparatus 100.

FIG. 1 illustrates one example of a CT imaging apparatus 100 for performing an imaging scan. A CT imaging acquisition system 102 includes a gantry 104 and a table 106 which moves along the z-axis. A patient or other object to be imaged (not shown) lies down on the table 106 and is moved to be disposed within an aperture 108 in the gantry 104. Once the patient or object is in position, an x-ray source 110 emits a projection of x-rays 112 to be gathered by an x-ray data measurement system 114 inside the gantry 104. (A portion 116 of the gantry 104 is cut away in FIG. 1 to show the x-ray source 110 and x-ray data measurement system 114 which are housed inside the gantry 104.) The data measurement system 114 includes several photodetectors each with an associated x-ray scintillator (not shown) disposed on a cradle 118. The x-ray source 110 and data measurement system 114 rotate together around the aperture 108 to record CT imaging data from various positions, often in conjunction with linear movement of the table 106. This rotation is possible because the x-ray source 110 and the cradle 118 are each mounted to a common rotor (not shown) inside the gantry 104.

The CT imaging acquisition system 102 then passes the CT imaging data on to a CT imaging, processing and display system 120 through a communication link 101. Although the systems 102 and 120 are shown and described here as being separate systems for purposes of illustration, they may in other embodiments be part of a single system. The CT imaging data passes to an image processor 122 which stores the data in a memory 124. The image processor 122 electronically processes the CT imaging data to generate images of the imaged patient or other object. The image processor 122 can show the resulting images on an associated display 126. A user input 128 such as a keyboard and/or mouse device may be provided for a user to control the processor 122.

CT Data Measurement Systems

Four Slices

As shown in FIGS. 2 and 3, one data measurement system described herein includes an organic photodiode array 200 which may be a printed organic photodiode array. The array 200 is composed of several, preferably organic photodiodes 202 printed on the front surface 203 of a support 204. The organic photodiodes 202 as shown in FIG. 2 are rectangular in shape, although any shape may be used, and the size of the photodiodes is preferably on the order of approximately 0.5 to 5 mm by 0.5 to 5 mm. The organic photodiodes 202 are arranged in groups 206 of photodiodes 202, with for example sixteen photodiodes 202 in each group 206. Although not shown in FIGS. 2 and 3, there is typically a gap in between any two adjacent photodiodes 202 in a given group 206, resulting in a pitch in each direction of approximately 1.2 mm. The groups 206 are arranged in for example four rows 208 and forty-two columns 210, although only three columns 210 are shown in FIG. 2, for a total of 2,688 photodiodes 202 in the array 200. Thus the organic photodiode array 200 will typically be approximately 75 to 100 cm in length L, approximately 15 cm in width W, and approximately 100 μm in thickness t. Such an array 200 is useful for a four slice CT imaging system, wherein each of the four rows 208 represents an imaging slice. Thus, the array 200 is disposed within a CT imaging apparatus 100 so that the z-axis is oriented as shown in FIG. 2. This arrangement of organic photodiodes 202 in an array 200 is merely representative; any other arrangement may be used as well to suit the needs of a particular application.

Each photodiode 202 is composed of a printed material, preferably an organic material. In a preferred embodiment, a PCBM-based polymeric material is used as a printed organic photodiode material. For example, Ramuz et al., "High Sensitivity Organic Photodiodes with Low Dark Currents and Increased Lifetimes", *Organic Electronics*, vol. 9, no. 3, pp. 369-376 (2008) report organic photodiodes incorporating PCBM/P3HT and other polymer blends. Also, Keivanidis et al., "X-Ray Stability and Response of Polymeric Photodiodes for Imaging Applications", *Applied Physics Letters*, vol. 92, no. 2 (3 pages) (2008) report organic photodiodes, including PCBM/P3HT based polymeric systems, which are x-ray hard. Using printing technology of the kind developed by Nanoident Co., whose diode arrays measured up to 160 cm, the macro organic photodiode array will span the whole arc length of the cradle, with scintillator arrays mounted upon it.

Sigma-Aldrich Company of Milwaukee, Wis. provides several PCBM materials which may be used to make suitable organic photodiodes, such as:

TABLE 1

Properties of Selected Sigma-Aldrich PCBMs

| Product | [60] PCBM | [70] PCBM | [84] PCBM | [60] ThCBM |
|---|---|---|---|---|
| Sigma-Aldrich Product Number | 684430 684449 684457 | 684465 | 684473 | 688215 |
| First Reduction Potential $E_{1/2}$ (V) | −1.078 | −1.089 | −0.730 | −1.08 |
| Solubility (mg/ml): | | | | |
| toluene | 10 | 20 | | 5 |
| p-xylene | 5 | 10 | | 5 |
| chlorobenzene | 25 | 40 | | 10 |
| chloroform | 25 | 30 | | 20 |
| o-dichloro-benzene (ODCB) | 30 | 70 | | 20 |
| Molar Extinction Coefficients ($mol^{-1}\ cm^{-1}$) | | | | |
| 400 nm | 4,900 | 19,000 | 28,000 | |
| 650 nm | <1,000 | 2,000 | 4,000 | |

The support 204 of the organic photodiode array 200 is preferably a stable yet bendable plastic film. The support 204 may be, for example, a polyethylene terephthalate (PET) film, a polyimide film, a polyaryletheretherketone (PEEK) film, or a nylon film. Several fiducial apertures 211 are placed along each side of the support 204.

The organic photodiodes 202 may be deposited on the support 204, for example, by a printing process. For a four slice array such as the array 200, suitable printing processes include roll-to-roll printing, silk-screen printing, and spin coating printing of the organic photodiodes 202 at low resolution on the support 204. An inkjet printing process may also be employed to deposit the organic photodiodes 202 on the support 204. As yet another possibility, Ludvig Edman et al., "A New Way Could Lead to Cheap and Flexible Electronics", *Printed Electronics World* (Apr. 13, 2009), report that a thin film of an organic material can be printed on a selected surface, with the parts of the film to remain in place being exposed to laser light, and then developed by rinsing with a solution to wash away the portions of the film not so exposed.

Figure 4:
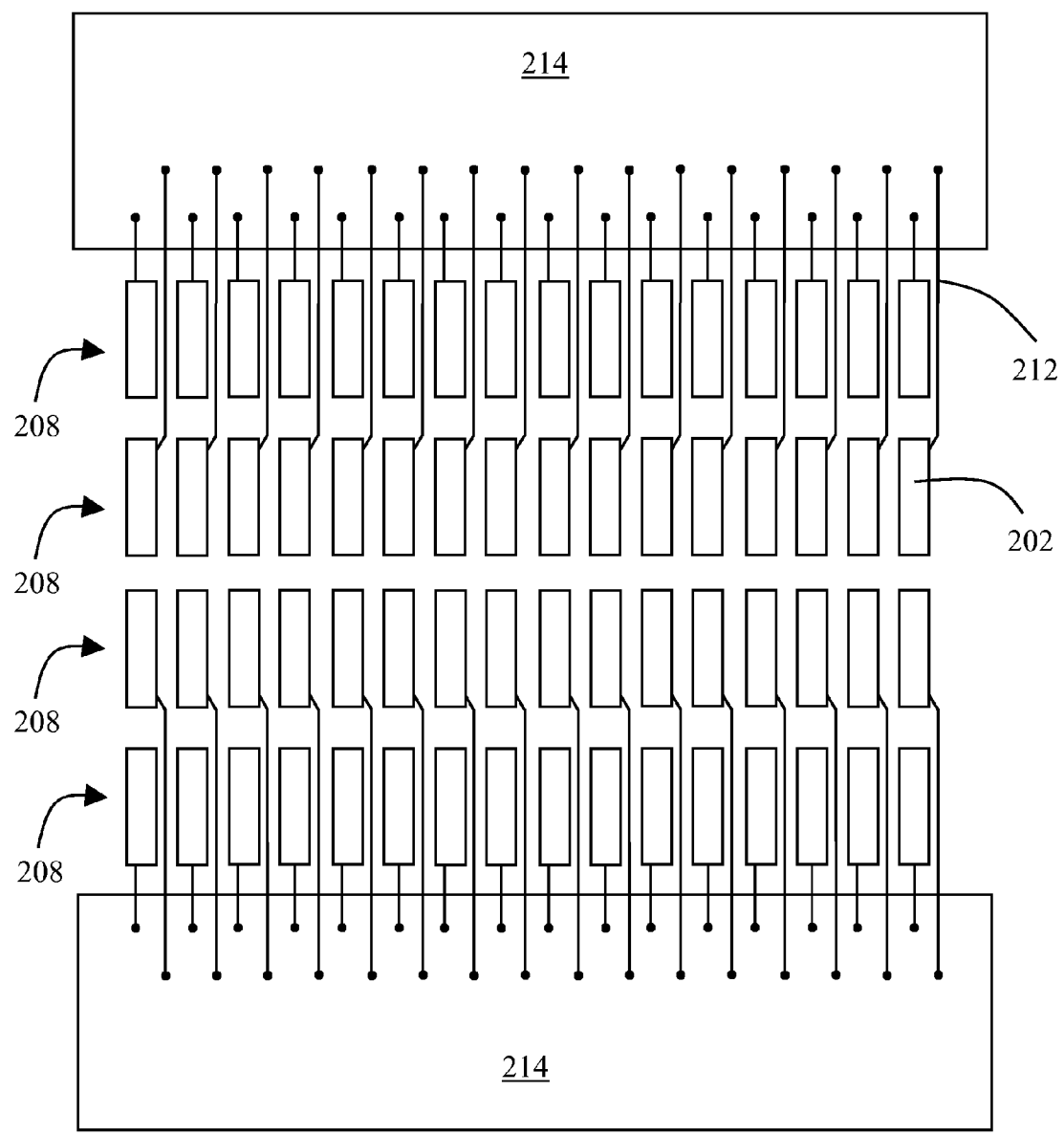
FIG. 4 is a close-up view of the front surface of the organic photodiode array 200.

As shown in FIG. 4, electrical conductors 212 on the front surface 203 of the support 204 lead from each organic photodiode 202 to a side of the array 200. FIG. 2 does not show the conductors 212 for the sake of clarity in that Figure. The conductors 212 for the organic photodiodes 202 in the two inner rows 208 may pass between two adjacent photodiodes 202 in the two outer rows 208. The conductors 212 connect the organic photodiodes 202 to "active" electronic components 214 mounted at each side of the array 200, such as for example amplifiers, analog-to-digital convertors, multiplexers, application-specific integrated circuits (ASICs), and the like, together with output connectors. The active electronic components 214 may be formed in approximately 5 cm wide margins along the sides. In this way, the conductors 212 may carry power to, and also carry output signals from, each organic photodiode 202. In addition, one electrode of each organic photodiode 202 is also connected to a common ground, such as through a transparent conducting layer disposed above the photodiodes 202.

As shown in FIGS. 5 and 6, a scintillator 502 is disposed on top of each organic photodiode 202 in the array 200, with each combination of a scintillator 502 and a photodiode 202 forming an x-ray detector dixel 503. In this way the organic photodiode array 200 is incorporated into a macro detector array 250. The scintillators 502 operate to convert incoming x-radiation into visible light, which may then in turn be measured by the organic photodiodes 202. Exemplary scintillating materials include gadolinium oxysulfide (GOS) and gadolinium gallium aluminium garnet (GGAG). For an organic photodiode 202 measuring approximately 1.0 mm by 1.0 mm, each scintillator 502 may measure approximately 1.1 mm by 1.1 mm in area, so that the scintillator 502 covers a slightly larger surface area than the photodiode 202 underneath it. The height of the scintillator 502 is determined by the required x-ray stopping power. For GOS an appropriate height is approximately 1.5 mm, and for GGAG an appropriate height is approximately 2.5 mm. A scintillator 502 may conveniently be bonded to an underlying organic photodiode 202 with an adhesive which provides optical coupling between the two elements to form a dixel 503. There is a gap 504 between each adjacent group 206 of photodiodes 202, in order to permit the entire detector array 250 to assume a curved configuration as described below.

The scintillators 502 may conveniently be pre-assembled as scintillator arrays 505 (not shown in the Figures), with each scintillator array 505 corresponding for example to a particular column 210 in the macro detector array 250. Thus, each scintillator array 505 comprises for example four rows of scintillators, with for example sixteen or thirty-two scintillators in each row. The spaces between the scintillators in these arrays 505 may be filled with white reflectors. The scintillator arrays 505 may then be disposed on top of the photodiodes 202, and glued in place, using for example capillary underfilling technology. To aid in the assembly process, the scintillator arrays 505 may additionally include fiducial apertures which properly line up with the fiducial apertures 211 of the photodiode array 200. In that way, both arrays 200 and 505 can be mounted on a planar jig having fiducial pins which extend through both sets of fiducial apertures, properly aligning the entire assembly before the adhesive is applied to bond the arrays together and permitted to cure.

As shown in FIG. 7, once the macro detector array 250 has been assembled including scintillators 502 to form dixels 503, it may be inserted into a cradle 118 for use as a data measurement system 114 in a CT imaging apparatus such as the apparatus 100 described above. Thus, FIG. 7 schematically illustrates the inter-relationships between the x-ray source 110 which produces the x-ray projections 112, the patient or object 702 to be imaged lying on a table 106, and the macro detector array 250. The cradle 118 may include fiducial pins 704, which extend through the fiducial apertures 211 in the support 204 of the array 250 in order to properly align the array 250 within the cradle 118 and, therefore, within the entire apparatus 100. The pins 704 may additionally be used to properly align one or more anti-scatter grids (not shown) above the array 250. The array 250 may additionally or solely be held in place on the cradle 118 with a suitable adhesive. The array 250 and cradle 118 together make up a data measurement system 114. The size of the dixels 503, in relation to the size of the other components in the apparatus, has been greatly exaggerated in FIG. 7 for purposes of illustration. As already mentioned, in an actual data measurement system 114, there might be approximately forty-two groups 206 of dixels 503 spanning the arc length of the data measurement system 114 instead of the fifteen groups 206 shown in the Figure. A layer 706 of white plastic, such as polytetrafluoroethylene (PTFE) loaded with $TiO_2$, may be placed over the inside surface of the arc of the array 250. This layer 706 adds strength to the array 250, and forms the top reflector for all of the dixels 503 in the array 250.

A macro detector array 250 including scintillators 502 to form dixels 503 may be manufactured, and assembled within a data measurement system, according to the process 800 illustrated in FIG. 8. The ordering of the steps of the process 800 as shown in FIG. 8 may be changed to suit the needs of a particular application, and some steps may be added or removed from the exemplary process 800 shown and described here.

The organic photodiodes 202 are deposited 802 on a front surface 203 of the support 204. This deposition may be achieved, for example, by a printing process whereby the organic material making up the photodiodes 202, such as a PCBM-based polymeric material, is printed on to the support 204. Depending on the size and application of the photodiode array 200, suitable printing processes might include roll-to-roll printing, silk-screen printing, spin coating printing, and ink jet printing. The organic material may also be deposited from solution and photo-etched to form patterns.

Fiducial apertures 211 are formed 804 in the support 204.

Electrical conductors 212 are deposited 806 on the front surface 203 of the support 204, with one conductor 212 leading from each organic photodiode 202 to a side of the array 200. The conductors 212, like the photodiodes 202 themselves, may be added with a printing process applied to the front surface 203 of the support 204 where the photodiodes 202 are located. Similarly, one electrode of each organic photodiode 202 is connected in common to ground, such as through a transparent conducting layer disposed above the photodiodes 202. Associated "active" electronic components 214 are added 808 at each side of the array 200, such as for example amplifiers, analog-to-digital convertors, multiplexers, application-specific integrated circuits (ASICs), and the like, together with output connectors.

Arrays 505 of scintillators 502 are prepared 810, with spaces between the scintillators 502 in these arrays 505 being filled with white reflectors. However, the tops of the scintillator arrays 505 may initially be left uncovered. Using pick-and-place technology, the scintillator arrays 505 are mounted 812 on top of the organic photodiodes 202 in the array 200 to form a macro detector array 250. The scintillator arrays 505 may be held in place with a suitable adhesive, including an optical coupling adhesive disposed directly between the scintillators 502 and the photodiodes 202. A gap 504 is left between each group of adjacent dixels 206 in order to permit the entire array 250 to assume a curved configuration.

The macro detector array 250 including scintillators 502 to form dixels 503 is bent 814 into an arc, to conform to the radius of a rigid cradle 118 centered on an x-ray source 110. The bent array 250 is mounted 814 to the cradle, such as with fiducial pins 704, and/or adhesive, or any other means to achieve the precise positioning required to properly focus the photodiodes 202 on the x-ray source 110.

The electronic connections are completed 816, and any further electronic components required to complete the assembly of the data measurement system are added. A layer 706 of white plastic, such as polytetrafluoroethylene (PTFE) loaded with $TiO_2$, may be added 818 over the inside surface of the arc of the array 250. This layer 706 adds strength to the array 250, and forms a uniform top reflector for the scintillators 502 in the dixels 503.

CT Data Measurement Systems

More than Four Slices

The macro detector array 250 discussed above is suitable for a four slice CT imaging apparatus. Making such an array 250 for larger CT imaging systems, such as sixteen to sixty-four slices, can be difficult. Enough room must be found on the front surface 203 of the array support 204 for both the photodiodes 202 and the conductors 212, without excessively reducing the active areas of the photodiodes 202 and reducing their sensitivity. To overcome such difficulties, an alternative macro organic photodiode array 900 is shown in FIGS. 9 and 10 which is more suitable to imaging systems with more than four slices. More particularly, half of such an array 900 on one side of a centerline 901 is shown in the Figures. The two halves of the array 900, one shown in the Figures and the other not shown, are symmetrical about the centerline 901.

Thus the array 900 is composed of several organic photodiodes 902 disposed on the front surface 903 of a support 904. The organic photodiodes 902 as shown in FIG. 9 are rectangular in shape, although any shape may be used, and the size of the photodiodes is preferably on the order of approximately 0.5 to 5 mm by 0.5 to 5 mm. The organic photodiodes 902 may be arranged in groups 906 of photodiodes 902, with for example sixteen photodiodes 902 in each group 906. The groups 906 are arranged in for example sixteen rows 908 and forty-two columns 910, although only three columns 910 are shown in FIG. 9. Thus the macro organic photodiode array 900 will typically be approximately 75 to 100 cm in length L, approximately 20 to 30 cm in width W, and approximately 100 µm in thickness t. Such an array 900 is useful for a sixteen slice CT imaging system, wherein each of the sixteen rows 908 represents an imaging slice. Thus, the array 900 is disposed within a CT imaging apparatus 100 so that the z-axis is oriented as shown in FIG. 9. This arrangement of organic photodiodes 902 in an array 900 is merely representative; any other arrangement may be used as well to suit the needs of a particular application.

Each photodiode 902 is composed of an organic material, as already discussed above in connection with the photodiodes 202 of the array 200. The organic photodiodes 902 may be deposited on the support 904, for example, by a printing process. Suitable printing processes include roll-to-roll printing, silk-screen printing, and spin coating printing of the organic photodiodes 902 at low resolution on the support 904. An ink jet printing process may also be employed to deposit the organic photodiodes 902 on the support 904. The organic material may also be deposited from solution and photo-etched to form patterns.

Also as in the array 200, the support 904 of the macro organic photodiode array 900 is preferably a stable yet bendable plastic film. The support 904 may be, for example, a polyethylene terephthalate (PET) film, a polyimide film, a polyaryletheretherketone (PEEK) film, or a nylon film. It likewise has fiducial apertures 911. However, unlike the array 200, the conductors 912 of the array 900 are not located on the front surface 903 of the support 904.

Rather, as schematically illustrated in FIGS. 10 and 11, the conductors 912 are located on the distal surface 905 of the support 904 opposite the front surface 903, and are connected to respective photodiodes 902 through holes 920 in the support 904. This construction is advantageous due to space limitations on the front surface 903 of the support 904, resulting from the number of photodiodes 902 located thereon. Because the distal surface 905 of the support 904 is free of any photodiodes 902, there is much more space available in which to place the conductors 912 than on the front surface 903.

The holes 920 may be made in the support 904 using the focussed beam of a continuous wave or a pulsed laser such as a 10.6 µm carbon dioxide ($CO_2$) laser or a 1.06 µm Nd-YAG laser. If a CW laser is used it is preferable to use nitrogen blanketing. The conductor 912 coating the relevant regions of the distal surface 905 of the support 904 is preferably a bright metal or other good reflector of the laser beam, and arrests its further penetration. After the holes 920 are formed, they can be filled with micro-drops of conductive adhesive 922 from the front surface 903 to complete the connection to the conductor 912 on the distal surface 905. Preferably, a flexible resin is employed to permit bending at a later stage without damage.

The conductors 912 may be formed on the distal surface 905 of the support 904 (which may be a non-absorbing glossy plastic) using conventional ink jet printing technology. A representative example of such technology is disclosed in U.S. Pat. No. 5,933,168, incorporated herein by reference for its disclosure of ink jet printing technology, which states droplets of 5 to 7 nanograms were produced. To adapt the teachings of that patent, or other conventional ink jet printing technology, it is desirable to choose a material for the photodiode 902 material and/or the conductor 912 and 922 material which matches the fluidic parameters of the ink fluid used. Ideally, these include the ratio of density to volume compressibility, kinematic viscosity, contact angle, and surface tension. It may be useful to select a rubber diaphragm resistant to the materials being printed. It is believed that ink jet printing is able to achieve a space between adjacent parallel conductors 912 of down to approximately 16 µm, which corresponds to a 32 µm pitch and a density of more than 30 conductors per millimeter.

In this way, as suggested in FIGS. 10 and 11, separate and densely spaced electrical conductors 912 lead from each organic photodiode 902 to a side of the array 900. The conductors 912 thus connect the organic photodiodes 902 to "active" electronic components 914 mounted at each side of the array 900, such as for example amplifiers, analog-to-digital convertors, multiplexers, application-specific integrated circuits (ASICs), and the like, together with output connectors. The electronic components 914 may be formed in approximately 5 cm wide margins along the sides, and may appear on either the front surface 903 or the distal surface 905 of the support 904. In this way, the conductors 912 may carry power to, and also carry output signals from, each organic photodiode 902. Also, one electrode of each organic photodiode 902 is connected to a common ground, such as through a transparent conducting layer disposed above the photodiodes 902.

A macro detector array 950 (not shown in the Figures), like the macro detector array 250, is formed by disposing scintillators 502 on top of each organic photodiode 902 to form dixels 503. The scintillators 502 may conveniently be pre-assembled as rectangular scintillator arrays 505, each corresponding to a particular column 910 in the macro detector array 950, as already discussed above in connection with the macro detector array 250.

Once the macro detector array 950 has been assembled, it may be inserted into a cradle 118 for use as a data measurement system 114 in a CT imaging apparatus such as the apparatus 100 described above. This process is substantially as shown and described above in connection with the macro detector array 250, including use of fiducial pins 704.

A macro organic photodiode array 900, and an associated macro detector array 950, may be manufactured and assembled within a data measurement system according to the process 1200 illustrated in FIG. 12. The ordering of the steps of the process 1200 as shown in FIG. 12 may be changed to suit the needs of a particular application, and some steps may be added or removed from the exemplary process 1200 shown and described here.

The organic photodiodes 902 are deposited 1202 on a front surface 903 of the support 904. This deposition may be achieved, for example, by a printing process whereby the organic material making up the photodiodes 902, such as a PCBM-based polymeric material, is printed on to the support 904. Depending on the size and application of the macro detector array 950, suitable printing processes might include roll-to-roll printing, silk-screen printing, spin coating printing, and ink jet printing. The organic material may also be deposited from solution and photo-etched to form a pattern.

Fiducial apertures 911 are formed 1204 in the support 904.

Electrical conductors 912 are deposited 1206 on the distal surface 905 of the support 904, with one conductor 912 leading from each organic photodiode 902 to a side of the macro detector array 950. The conductors 912, like the photodiodes 902 themselves, may be added with a printing process. Holes 920 are formed 1208 in the support 904, and filled 1210 with a conductor such as a flexible epoxy resin 922 to connect each organic photodiode 902 to an associated conductor 912. One electrode of each organic photodiode 902 is connected to a common ground, such as through a transparent conducting layer disposed above the photodiodes 902. Associated "active" electronic components 914 are added 1212 at each side of the macro detector array 950, such as for example amplifiers, analog-to-digital convertors, multiplexers, application-specific integrated circuits (ASICs), and the like, together with output connectors.

Arrays 505 of scintillators 502 (not shown) are prepared 1214, with spaces between the scintillators 502 in these arrays 505 being filled with white reflectors. However, the tops of the scintillator arrays 505 may be initially left uncovered. Using pick-and-place technology, the scintillator arrays 505 are mounted 1216 on top of the organic photodiodes 902 to form dixels 503 in the macro detector array 950. The scintillator arrays 505 may be held in place with a suitable adhesive, including an optical coupling adhesive disposed directly between the scintillators 502 and the photodiodes 902. A gap 504 is left between adjacent groups 906 of dixels 503, in order to permit the entire array 950 to assume a curved configuration.

The macro detector array 950 is bent into an arc, to conform to the radius of a rigid cradle 118 centered on an x-ray source 110. The bent array 950 is mounted 1218 to the cradle, such as with fiducial pins 704, and/or adhesive, or any other means to achieve the precise positioning required to properly focus the photodiodes 902 on the x-ray source 110.

The electronic connections are completed 1220, and any further electronic components required to complete the assembly of the data measurement system are added. A layer 706 of white plastic, such as polytetrafluoroethylene (PTFE) loaded with $TiO_2$, may be added 1222 over the inside surface of the arc of the scintillators 502 in the array 950. This layer 706 adds strength to the array 950, and forms the top reflector for the dixels 503.

In this example, the macro detector array 950 is a sixteen slice array, with eight slices or rows 908 appearing on each side of the centerline 901 of the array 950. It is believed that present printing technology has an upper pitch limit of 32 conductors per millimeter. Applying that upper limit, and assuming a photodiode 902 dixel pitch of 1 mm, the design of the array 950 may be directly applied to make an array with thirty-two slices on each side of a centerline 901, for a total of sixty-four slices. Of course, if higher pitch printing methods are found or known, the number of available slices will correspondingly increase. Alternatively, if a lower spatial resolution of the imaging process is acceptable, the photodiode 902 dixel pitch may be reduced, providing more room in which to place the conductors 912 and so increase the number of slices.

In yet another embodiment, illustrated in FIG. 13, a method is provided to increase the number of imaging slices to be made with a macro organic photodiode array 1300 and macro detector array 1350. In this embodiment, the support 1304 has multiple layers. Four layers 1341, 1342, 1343 and 1344 are shown in FIG. 13 as a representative example. Each of the layers 1341, 1342, 1343 and 1344 is preferably a stable yet bendable plastic film, such as for example a polyethylene terephthalate (PET) film, a polyimide film, a polyarylethertherketone (PEEK) film, or a nylon film. The thickness t of an individual layer may be approximately 10 μm to 100 μm. The organic photodiodes 1302 are disposed on the front surface 1351 of the top layer 1341.

To assemble the multi-layer macro organic photodiode array 1300, each layer 1341, 1342, 1343 and 1344 is printed with an appropriate network of conductors 1312 on its respective front surface 1351, 1352, 1353 or 1354. The layers 1341, 1342, 1343 and 1344 are glued together with a flexible adhesive to form the support 1304. Holes 1320 are formed in the support 1304, providing a communication path between each conductor 1312 and a corresponding organic photodiode 1302 on the top surface 1351. The holes 1320 may be made in the support 1304 using the focussed beam of a continuous wave or a pulsed laser, such as a 10.6 μm carbon dioxide ($CO_2$) laser or a 1.06 μm Nd-YAG laser. If a CW laser is used it is preferable to use nitrogen blanketing. The conductors 1312 are preferably a bright metal or other good reflector of the laser beam, to help protect deeper layers in the support 1304 from laser beam damage during formation of a hole 1320. Thus a conductor 1312 forms the base of each hole 1320. Control of the laser beam intensity and exposure time can ensure that the laser beam penetrates the multilayer support 1304 only as far as the reflective metal layer 1312 and no further. After the holes 1320 are formed, they can be filled with conductive adhesive (not shown) extending from the photodiode surface 1351 to the bottom of the hole 1320, to complete the connection to each conductor 1312.

Thus, by providing multiple layers of pathways, the available space in the array 1300 to hold the conductors 1312 is greatly increased. This allows more imaging slices to be formed in the array, without sacrificing the quality of images obtained using the array.

Spectral CT Scanners

The concepts discussed above can be readily applied to a spectral CT apparatus. For spectral CT, the data measurement system 114 combines two separate macro detector arrays together, with two organic photodiode arrays, as shown for example in FIG. 14 as a bottom macro detector array 1402 and a top macro detector array 1404. The top array is preferentially responsive to the low-energy (softer) incident x-rays, which it filters out, leaving only the high energy (hard) x-rays to which the bottom array is preferentially sensitive.

The bottom macro detector array 1402 may be identical to the macro detector array 250 (for up to a four slice spectral CT scanner), the macro detector array 950 (for up to a sixty-four slice spectral CT scanner), or the macro detector array 1350 (for a greater than sixty-four slice spectral CT scanner). Thus the bottom macro detector array 1402 incorporates GOS:Pr, Ce or GGAG:Ce or similar high-Z scintillators 502 in the standard size, and with standard fiducial hole spacing for the fiducial pins 704.

The top macro detector array 1404 is added in order to provide spectral CT imaging capability. There are two principal differences in the design of the top array 1404 versus the bottom array 1402. First, the top array 1404 is a lower energy array, responding preferentially to softer x-rays, and thus including for example ZnSe:Tl scintillators instead of the GOS:Pr, Ce or GGAG:Ce scintillators of the bottom macro detector array 1402. Second, in comparison with the components of the bottom macro detector array 1402, the scintillators and photodiodes of the top macro detector array 1404 are slightly smaller in size, with slightly smaller separations, and with fiducial hole spacing slightly reduced. This permits the top macro detector array 1404 to be mounted on the bottom macro detector array 1402 in the cradle 118, and yet still be focused on the x-ray source 110 at the correspondingly slightly smaller radius. It also permits the top macro detector array 1404 to be mounted within the data measurement system 114 using the same fiducial pins 704 as the bottom macro detector array 1402, for precise positioning. Separate top layers 706 may be used with each macro detector array 1402 and 1404.

Fourth Generation CT Scanners

The technology described herein may also be used in connection with fourth-generation CT scanners, such as the apparatus 1500 shown in FIGS. 15 and 16. In a fourth generation CT imaging apparatus, the data measurement system comprises a complete ring of x-ray detectors surrounding the region of interest to be imaged. An offset rotating x-ray source emits x-rays which are received by the detectors, which remain stationary.

Thus, referring to FIGS. 15 and 16, a fourth generation CT imaging apparatus 1500 has a fixed gantry 1502 with an aperture 1504 to receive a table 1506 which linearly moves along the z axis, in and out of the aperture 1504. A patient or other object to be imaged by the fourth generation CT apparatus 1500 is disposed on top of the table 1506. An offset x-ray source 1508 rotates around the region of interest, along a circular path 1510. At least a first ring disposed within the gantry 1502 comprises a macro detector array 1512, as discussed above. More particularly, the support elements 204, 904 and 1304 of the embodiments respectively described above could have a length L equal to the inner circumference of a ring-shaped cradle (not shown) within the gantry 1502. In that way the array 250, 950 or 1350 including photodiodes and associated scintillators may be mounted on the inside circumference of the ring cradle, using adhesive and/or fiducial aperture-pin arrangements. In other words, in a fourth generation CT apparatus 1500, the fixed ring cradle takes the place of the rotating cradle 118 of the arrays 250, 950 and 1350 described above. The ring cradle may be in the form of an entire ring, or only segments of a complete ring.

Spectral CT capability may also be added to the fourth generation CT apparatus 1500, by adding a second ring-shaped macro detector array 1514 inside the first ring-shaped macro detector array 1512. Thus, in this spectral CT embodiment, the first macro detector array 1512 incorporates high energy scintillators 502 such as GOS:Pr, Ce or GGAG:Ce, while the second macro detector array 1514 is a lower energy array including for example ZnSe:Tl scintillators. Also, in comparison with the components of the first macro detector array 1512, the scintillators and photodiodes of the second macro detector array 1514 are slightly smaller in size, with slightly smaller separations, and with fiducial hole spacing slightly reduced. This permits the second macro detector array 1514 to be mounted within the circumference of the first macro detector array 1512 on the ring-shaped support. It also permits the second macro detector array 1514 to be mounted using the same fiducial pins as the first macro detector array 1512, for precise positioning. More array layers may additionally be used.

The macro organic photodiode arrays and associated macro detector arrays as described herein are particularly well suited to a fourth generation CT imaging apparatus 1500. The macro detector arrays are much less costly to produce and install than ceramic scintillators and silicon photodiodes used in present CT imaging apparatuses. The electronic connectivity costs are also substantially reduced. Thus the cost savings realized in producing enough detectors to completely surround the region of interest can be substantial. Moreover, the requirements for uniformity and temporal stability in the data measurement system are much reduced in fourth generation CT, because the sensitivity, dark noise and linearity of each detector can all be calibrated immediately prior to each imaging exposure. And, only the x-ray source 1508 is required to rotate in the fourth generation CT apparatus 1500, so the gantry mechanical costs can be reduced because a lower mechanical precision is required.

Composite Scintillators

The embodiments described above have incorporated inorganic scintillators such as GOS and GGAG. As one alternative, use of composite scintillators such as described in U.S. Patent Application No. 61/087,195 (filed Aug. 8, 2008) and PCT Patent Application No. PCT/IB 2008/055276 (filed Dec. 12, 2008 and claiming priority to U.S. Patent Application No. 61/087,195 filed Dec. 21, 2007) can be used. Those applications are hereby expressly incorporated by reference herein for their disclosure of composite scintillators. Such composite scintillators can achieve savings in cost and improved thermal stress performance.

Thus FIG. 17 illustrates a process 1700 of manufacturing and assembling a data measurement system including a macro organic photodiode array with composite scintillators. The ordering of the steps of the process 1700 as shown in FIG. 17 may be changed to suit the needs of a particular application, and some steps may be added or removed from the exemplary process 1700 shown and described here.

The organic photodiodes are deposited 1702 on the front face of a support, as described above. This deposition may be achieved, for example, by a printing process whereby the organic material making up the photodiodes, such as a PCBM-based polymeric material, is printed on to the support. Depending on the size and application of the photodiode array, suitable printing processes might include roll-to-roll printing, silk-screen printing, spin coating printing, and ink jet printing. The organic material may also be deposited from solution and photo-etched to form patterns. Fiducial apertures are formed 1704 in the support, and conductor holes are also formed 1706 in the support. Electrical conductors are deposited 1708 on the distal surface of the support, with one conductor leading from each organic photodiode to a side of the array. The conductors, like the photodiodes themselves, may be added using a printing process applied to the support. One electrode of each organic photodiode is connected to a common ground, such as through a transparent conducting layer disposed above the photodiodes.

A composite scintillator block is then cast 1710 over the front face of the support, and cured 1712. A series of parallel slots are cut 1714 in the scintillator block, corresponding to borders between adjacent organic photodiodes underneath the scintillator block. In this way, elongated slices are formed in the scintillator block. A white reflector is coated within the slots between the slices, and on the edge faces, of the scintillator block and cured 1716.

Another series of cuts are made 1718 to the scintillator block, to form slots perpendicular to the previous cuts 1714, so that the combined slot pattern forms dixels in combination with the photodiodes underneath the scintillator block. A white reflector is coated within the new slots, and on the edge faces, of the scintillator block and cured 1720. If desired, some of the slots may be widened 1722 to form modules, so that the array may more easily be bent into a curved configuration.

Conductive adhesive is placed 1724 within the conductor holes of the support, in order to electrically connect the organic photodiodes on the front surface of the support to the conductors on the distal surface of the support. Associated "active" electronic components are mounted 1726 at each side of the array, such as for example amplifiers, analog-to-digital convertors, multiplexers, application-specific integrated circuits (ASICs), and the like, together with output connectors. An anti-scatter grid may also be added 1726 to the array. Then the data measurement system is bent into an arc and placed within a cradle, by positioning the fiducial apertures of the support over fiducial pins in the cradle to properly focus on an x-ray source. Using an appropriate geometry, this process may be used for third or fourth generation data measurement systems.

Printed Imaging Slice Elements

Yet another alternative data measurement system 1800 construction is illustrated in FIGS. 18 and 19. Such a system 1800 is made by combining together several sectorial-shaped elements 1801 in a stacked relationship, wherein each element 1801 corresponds to a single imaging slice of the array 1800. As shown in FIG. 18, each slice array element 1801 includes several organic photodiodes 1802 and corresponding scintillators 1803 deposited on a first side 1805 of a support 1804, preferably in groups 1806. For ease of illustration, the individual photodiodes 1802 and scintillators 1803 of only one group 1806 are shown in FIG. 18. The organic photodiodes 1802 and scintillators 1803 as shown in the Figure are sectorial in shape, although any shape may be used. The cross-sectional size of the top of the scintillators 1803 exposed to the incoming radiation R is preferably on the order of approximately 0.5 to 5 mm, and preferably slightly larger at the base than at the tip. The scintillators are preferably on the order of approximately 0.5 to 6 mm, to absorb all the radiation R. Thus, the array 1800 is disposed within a CT imaging apparatus 100 so that the z-axis is oriented as shown in FIG. 19. The thickness t of each organic photodiode slice 1801 along the z-axis is preferably approximately 100 μm or less, so that most of the x-ray radiation R is absorbed in the scintillators 1803, and the geometric quantum efficiency (DQDE) is high. In an actual slice element 1801, approximately forty-two groups 1806 with approximately sixteen photodiodes 1802 in each group (or six-hundred and seventy-two total photodiodes 1802) for example may span the arc length of the support 1804, instead of the thirteen groups 1806 shown in the Figure.

Each photodiode 1802 is composed of an organic material, as already discussed above in connection with the other embodiments herein. The organic photodiodes 1802 may be deposited on the support 1802, for example, by a printing process. Suitable printing processes include roll-to-roll printing, silk-screen printing, and spin coating printing of the organic photodiodes 1802 at low resolution on the support 1802. An ink jet printing process may also be employed to deposit the organic photodiodes 1802 on the support 1804. The organic material may also be deposited from solution and photo-etched to form patterns.

The support 1804 of the system 1800 is preferably a stable rigid plastic film. The support 1804 may be, for example, a polyethylene terephthalate (PET) film, a polyimide film, a polyaryletheretherketone (PEEK) film, or a nylon film. An additional thin metallic support (not shown) may be added to provide strength and rigidity. The support 1804 likewise has fiducial apertures 1811, similar to the other embodiments.

Electrical conductors (not shown in the Figures) lead from each organic photodiode 1802 to "active" electronic components 1814 mounted on the support 1804. Such components may include for example amplifiers, analog-to-digital convertors, multiplexers, application-specific integrated circuits (ASICs), and the like, together with output connectors. The conductors may be formed using conventional ink jet printing technology. The conductors may be located on the first surface 1805, which also has the photodiodes 1802. They may alternatively be located on the opposite surface of the support 1804, such as by placing holes through the support 1804 using the focussed beam of a continuous wave or a pulsed laser such as a 10.6 μm carbon dioxide ($CO_2$) laser or a 1.06 μm Nd-YAG laser. Or, several layers of support material 1804 may be used similarly to the embodiment of FIG. 13 in order to make enough room to fit all the conductors. One electrode of each organic photodiode 1802 is connected to a common ground, such as through a transparent conducting layer disposed above the photodiodes 1802.

Once several slice elements 1801 have been made, a corresponding array 1800 may be assembled by stacking several slice elements 1801 together. This is illustrated in FIG. 19, using four elements 1801 which corresponds to a four slice imaging apparatus 100. Ideally the slices 1801 are slightly tapered, being thicker at the base than at the tip to "focus" them on the x-ray source 110. Fiducial pins may extend through aligning fiducial holes 1811 in each slice element 1801, to properly position each element 1801 within the array 1800.

FIG. 20 shows a slice element 2001 suitable for a spectral CT imaging apparatus. Accordingly, the element 2001 corresponds to a single imaging slice, which when stacked with other similar elements 2001 in the manner described in connection with the embodiment of FIGS. 18 and 19 forms a system 2000 (not shown) for imaging. The slice element 2001 includes several organic photodiodes 2002 and corresponding scintillators 2003 deposited on a first side 2005 of a support 2004, preferably in groups 2006. For ease of illustration, the individual photodiodes 2002 and scintillators 2003 of only one group 2006 are shown in FIG. 20. The organic photodiodes 2002 and scintillators 2003 as shown in the Figure are sectorial in shape, although any shape may be used. The cross-sectional size of the scintillators 2003 from the standpoint of the incoming radiation R is preferably on the order of approximately 0.5 to 5 mm by 0.5 to 5 mm. The size of the photodiodes 2002, in relation to the size of the other components in the slice element 2001, has been greatly exaggerated in FIG. 20 for purposes of illustration. In an actual slice element 2001, for example approximately forty-two groups 2006 would span the arc length of the support 2004, instead of the thirteen groups 2006 shown in the Figure.

Each of the groups 2006 in a first (remote) array 2012 of photodiodes 2012 incorporates high energy scintillators 2003 such as GOS:Pr, Ce or GGAG:Ce, while the second (closer) array 2014 is a lower energy array including for example ZnSe:Tl scintillators 2003. Also, in comparison with the components of the first array 2012, the scintillators and photodiodes of the second array 2014 are slightly smaller in size, with slightly smaller separations. This permits the second array 2014 to be mounted above the first array 2012, and still be appropriately focused on the source of the incoming radiation R.

Although not shown in the Figures, a pair of photodiode 2002/scintillator combinations forming an imaging dixel in the element 2001 may be mounted upon thin, heavy metal (40μ to 80μ Mo) supporting sheets disposed in between the dixels and the slices. These sheets may also act as the fins of an anti-scatter collimator to prevent scattered radiation R from reaching the pixels of the detectors and clouding the image.

Using an appropriate geometry, this process may be used for either third or fourth generation data measurement systems.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof. The invention may take form in various components and arrangements of components, and in various steps and arrangements of steps. The drawings are only for purposes of illustrating the preferred embodiments and are not to be construed as limiting the invention.

Having thus described the preferred embodiments, the invention is now claimed to be:

1. An imaging system comprising:
a radiation source which rotates around a central z-axis of the imaging system to perform imaging scans;
an organic photodiode array including several discrete organic photodiodes arranged in rows and columns on a curved support, such that each row of organic photodiodes is aligned along the curve of the curved support, and each column of organic photodiodes is aligned in parallel to the central z-axis of the imaging system; and
conductor paths operatively connecting each of the organic photodiodes to one or more active electronic components disposed on the curved support;
wherein the curved support is comprised of more than one layer including a top layer and one or more under-layers, the organic photodiodes are disposed on the top layer, and each under-layer comprises a top surface which is proximate to the top layer and on which is disposed at least one of the conductor paths.

2. The imaging system of claim 1, wherein the organic photodiodes comprise a PCBM-based polymeric material.

3. The imaging system of claim 1, wherein the curved support comprises a bendable film.

4. The imaging system of claim 3, wherein the bendable film comprises a PET film, a polyimide film, a PEET film, or a nylon film.

5. The imaging system of claim 1, wherein each row of organic photodiodes corresponds to a single imaging slice during imaging scans performed by the imaging system.

6. The imaging system of claim 1, further comprising one or more scintillators disposed between the radiation source and the organic photodiodes.

7. The imaging system of claim 6, wherein the scintillators are formed from a composite scintillator material.

8. The imaging system of claim 1, wherein the organic photodiodes are disposed on the curved support by a printing process.

9. The imaging system of claim 1, wherein the curved support extends around a complete circumference of the central z-axis of the imaging system.

10. The imaging system of claim 1, wherein the organic photodiode array comprises two layers of organic photodiodes, a first layer associated with one or more high energy scintillators, and a second layer associated with one or more low energy scintillators.

11. An imaging system comprising:
a radiation source which rotates around a central z-axis of the imaging system to perform imaging scans; and
an organic photodiode array comprising at least two sectorial-shaped elements in a stacked relationship with each other, with each sectorial-shaped element comprising a support and several discrete organic photodiodes arranged on the support;
conductor paths operatively connecting each organic photodiode to one or more active electronic components disposed on the support corresponding to the photodiode;
wherein the support is comprised of more than one layer including a top layer and one or more under-layers, the organic photodiodes are disposed on the top layer, and each under-layer comprises a top surface which is proximate to the top layer and on which is disposed at least one of the conductor paths.

12. The imaging system of claim 11, wherein each organic photodiode is sectorial-shaped.

13. The imaging system of claim 11, wherein each sectorial-shaped element further comprises at least one scintillator disposed on the support between the radiation source and each organic photodiode.

14. The imaging system of claim 13, wherein each scintillator and each organic photodiode is sectorial-shaped and focused on the radiation source.

15. The imaging system of claim 13, wherein each sectorial-shaped element comprises an inner, lower energy array of scintillators and organic photodiodes, as well as an outer, higher energy array of scintillators and organic photodiodes.

16. The imaging system of claim 11, wherein the thickness of each sectorial-shaped element along the z-axis is approximately 100 μm or less.

17. The imaging system of claim 11, wherein each support comprises at least one fiducial aperture in order to align the sectorial-shaped elements in the stacked relationship.

18. The imaging system of claim 11, wherein each support comprises a stable rigid plastic film.

19. A bendable organic photodiode array assembly for use in an imaging system, the array comprising:
a bendable support;
several discrete organic photodiodes disposed on the support;
one or more scintillators disposed above the organic photodiodes on the support;
one or more active electronic components disposed on the support; and
conductor paths operatively connecting each of the organic photodiodes to at least one of the active electronic components;
wherein the support is comprised of more than one layer including a top layer and one or more under-layers, the organic photodiodes are disposed on the top layer, and each under-layer comprises a top surface which is proximate to the top layer and on which is disposed at least one of the conductor paths.

20. The bendable array assembly of claim 19, wherein the organic photodiodes are arranged in rows and columns on the bendable support, each row of organic photodiodes corresponds to a single imaging slice during imaging scans performed by an imaging system, and the columns are aligned in parallel to a central z-axis of the imaging system.

21. The bendable array assembly of claim 19, wherein the organic photodiodes comprise a PCBM-based polymeric material.

22. The bendable array assembly of claim 19, wherein the bendable support comprises a PET film, a polyimide film, a PEET film, or a nylon film.

23. The bendable array assembly of claim 19, wherein the scintillators are formed from a composite scintillator material.

24. The bendable array assembly of claim 19, wherein the assembly is mounted on a cradle within an imaging system to form an imaging data measurement system.

25. The bendable array assembly of claim 19, wherein the organic photodiodes are disposed on the support by a printing process.

26. The bendable array assembly of claim 19, wherein the bendable support has a length which is approximately equal to an entire circumference surrounding a central z-axis of the imaging system, for use in a fourth generation imaging system.

27. The bendable array assembly of claim 19, wherein the organic photodiode array comprises two layers of organic photodiodes, a first layer associated with one or more high energy scintillators, and a second layer associated with one or more low energy scintillators.

28. The bendable array assembly of claim 19, wherein the scintillators are arranged on the bendable support in groups with a gap between any two adjacent groups which is wide enough to facilitate bending of the array assembly without interference between the scintillators.

29. The bendable array assembly of claim 19, further comprising one or more fiducial apertures disposes in the bendable support.

* * * * *